United States Patent
Arai et al.

[11] Patent Number: 5,865,576
[45] Date of Patent: Feb. 2, 1999

[54] RELATIVE POSITIONING MACHINE

[75] Inventors: Dai Arai; Jun Watari; Takashi Yoshida; Naohide Hata; Tetsuharu Komatsu, all of Sayama, Japan

[73] Assignee: Honda Giken Kogyo Kabushiki Kaisha, Tokyo, Japan

[21] Appl. No.: 768,844

[22] Filed: Dec. 18, 1996

[30] Foreign Application Priority Data

| Dec. 18, 1995 | [JP] | Japan | 7-329261 |
| Dec. 18, 1995 | [JP] | Japan | 7-329263 |
| Mar. 26, 1996 | [JP] | Japan | 8-070775 |
| Mar. 26, 1996 | [JP] | Japan | 8-097495 |

[51] Int. Cl.$^6$ .................................................. B23Q 1/25
[52] U.S. Cl. .......................... 409/201; 408/89; 408/91; 408/236; 219/121.67; 409/224
[58] Field of Search ........................... 409/201, 216, 409/224, 235; 408/88, 89, 90, 91, 87, 234, 236, 237, 701; 219/121.67, 121.82

[56] References Cited

U.S. PATENT DOCUMENTS

| 3,783,225 | 1/1974 | Filsinger | 408/89 |
| 4,776,749 | 10/1988 | Wanzenberg et al. | 408/236 |
| 5,259,710 | 11/1993 | Charles | 409/201 |
| 5,354,158 | 10/1994 | Sheldon et al. | 409/201 |
| 5,401,128 | 3/1995 | Lindem et al. | 408/236 |
| 5,575,597 | 11/1996 | Bailey et al. | 408/236 |

FOREIGN PATENT DOCUMENTS 2-279249  11/1990  Japan ....................................... 408/89

*Primary Examiner*—Daniel W. Howell

[57] ABSTRACT

A relative positioning machine has a first panel for supporting a spindle thereon, a second panel for supporting a workpiece, first through fourth support mechanisms by which the first and second panels are tiltably supported for angular movement about an X1 axis, an X2 axis, a Y1 axis, and a Y2 axis, and first through fourth actuator mechanisms for individually tilting the first and second panels about the X1 axis, the X2 axis, the Y1 axis, and the Y2 axis. The spindle 11 and hence a machining unit such as a drill bit mounted thereon, and the workpiece can quickly and easily be positioned relatively to each other for allowing the machining tool to machine the workpiece at any of various areas at various angles on the workpiece. The relative positioning machine is relatively small in size and allows the workpiece to be machined quickly by the machining tool.

36 Claims, 37 Drawing Sheets

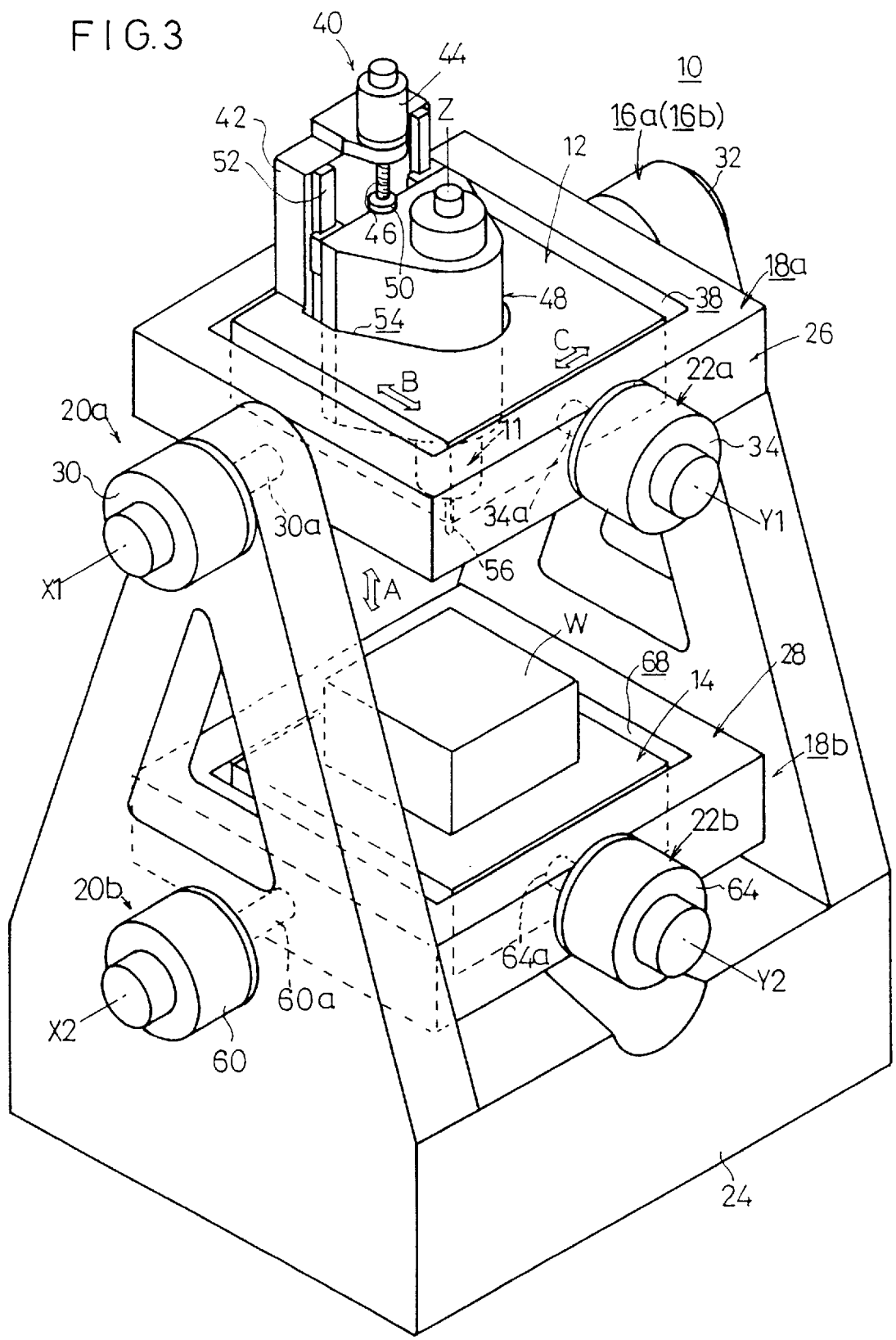

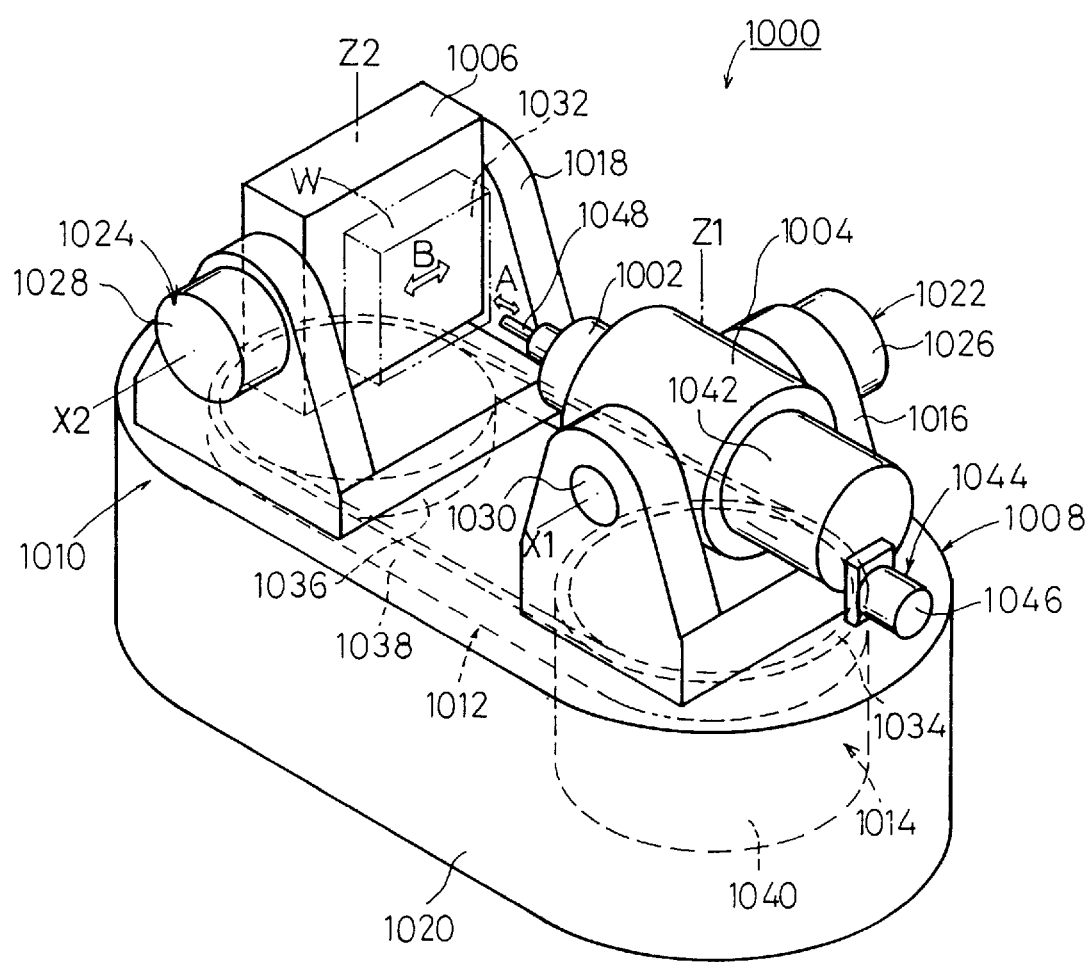
F I G. 34

RELATIVE POSITIONING MACHINE

BACKGROUND OF THE INVENTION

1. Field of the Invention

The present invention relates to a relative positioning machine for positioning two members which support a machining tool and a workpiece, respectively, for example, relatively to each other universally in two- and three-dimensional spaces before the two members act with each other, e.g., the machining tool machines the workpiece.

2. Description of the Related Art

Various machine tools are used in the art to machine, e.g., drill, mill, or grind, workpieces with drill bits or cutters.

FIG. 37 of the accompanying drawings shows a conventional machine tool 1 having a spindle 2 rotatable about its own axis and reciprocally movable vertically in the directions indicated by the arrow A. A drill bit 4 is mounted on the spindle 2. A workpiece W is supported on a base 5 and has a plurality of areas 6a~6n to be successively aligned with and drilled by the drill bit 4.

In operation, the spindle 2 and the drill bit 4 are rotated in unison with each other, and moved downwardly toward the workpiece W to drill one of the areas 6a~6n, e.g., the area 6a, with the rotating drill bit 4. After the area 6a has been drilled, the spindle 2 is elevated to lift the drill bit 4 off the workpiece W. Thereafter, the spindle 2 is horizontally moved a predetermined distance in one of the directions indicated by the arrows B, C until the drill bit 4 is vertically aligned with another one of the areas 6b~6n, e.g., the area 6b. Then, the spindle 2 and the drill bit 4 are rotated in unison with each other, and moved downwardly toward the workpiece W to drill the area 6b with the rotating drill bit 4. In this manner, the areas 6a~6n of the workpiece W are successively drilled by the drill bit 4.

For successively drilling the areas 6a~6n of the workpiece W, it is necessary to horizontally move the spindle 2 a predetermined distance in one of the directions indicated by the arrows B, C to bring the drill bit 4 into vertical alignment with one of the areas 6a~6n each time it is to be drilled. Since the machine tool 1 is considerably heavy, it develops a large inertia when it is horizontally moved. Therefore, a high-power actuating mechanism is required to horizontally move the machine tool 1, and it is highly difficult or almost impossible to quickly position the machine tool 1 into vertical alignment with one of the areas 6a~6n.

The process of positioning the drill bit 4 and the workpiece W with respect to each other is made all the more complicated if the areas 6a~6n are to be drilled to form holes that are inclined in various directions. Drilling such inclined holes in the workpiece W is quite an inefficient task to perform.

The above positioning problem also occurs in other machining operations including applying a laser beam to form a hole in a workpiece, to cut a workpiece, and to weld workpieces, and applying a water jet to machine a workpiece in various ways.

SUMMARY OF THE INVENTION

It is a general object of the present invention to provide a relative positioning machine which is capable of quickly positioning two members which support, e.g., a machining tool and a workpiece, respectively, relatively to each other with relatively small forces, for quick subsequent interaction between those members, and which may be relatively small in size.

The above and other objects, features, and advantages of the present invention will become apparent from the following description when taken in conjunction with the accompanying drawings in which preferred embodiments of the present invention are shown by way of example.

BRIEF DESCRIPTION OF THE DRAWINGS

FIG. 3 is a perspective view of a machine tool which incorporates a relative positioning machine according to a first embodiment of the present invention;

FIG. 34 is a perspective view of a machine tool which incorporates a relative positioning machine according to a twelfth embodiment of the present invention;

DETAILED DESCRIPTION OF THE PREFERRED EMBODIMENTS

Prior to describing the preferred embodiments of the present invention, the principles of positioning machines according to the present invention will first be described below with reference to FIGS. 1A, 1B, 2A, and 2B.

Figure 1A:
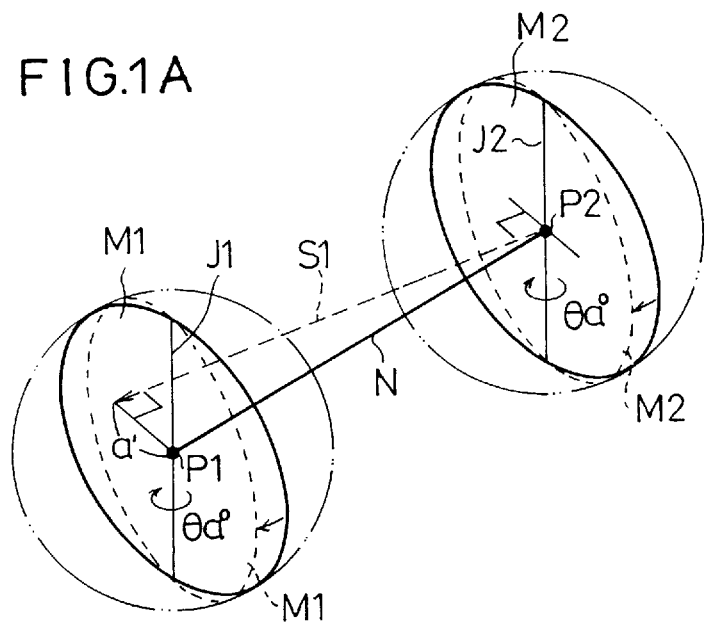
FIG. 1A is a schematic diagram illustrative of principles of the present invention, showing first and second members which are turned the same angle in the same direction.

As shown in FIG. 1A, first and second axes J1, J2 which lie on respective first and second members M1, M2 spaced from each other extend perpendicularly to a straight line N interconnecting points P1, P2 on the first and second members M1, M2 and also extend respectively through the points P1, P2. When the first and second members M1, M2 are not turned about the first and second axes J1, J2, respectively, as indicated by the solid lines in FIG. 1A, a line S1 of action extending from the second member M2 toward the first member M1 is aligned with the straight line N and points to the point P1. When the first and second members M1, M2 are turned the same angle $\theta a°$ in the same direction about the first and second axes J1, J2, respectively, the line S1 of action points to a position on the first member M1 which is spaced a distance "" from the point P1, and extends perpendicularly to the first member M1.

Figure 1B:
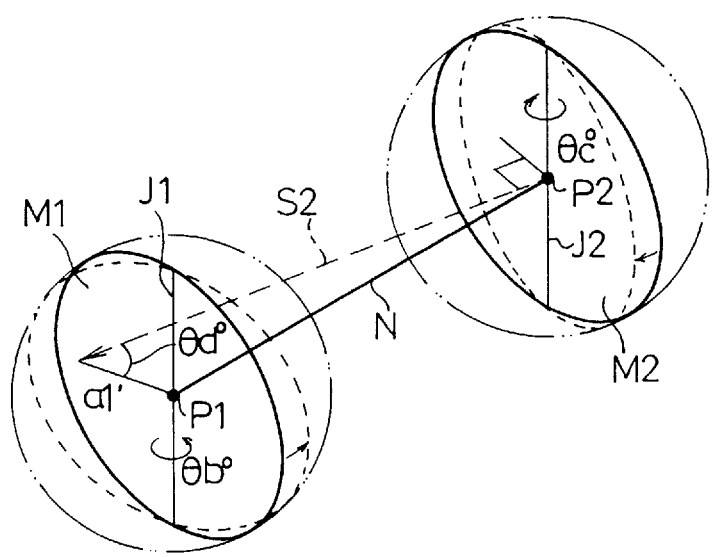
FIG. 1B is a schematic diagram illustrative of principles of the present invention, showing the first and second members which are turned respective angles in respective different directions.

As shown in FIG. 1B, when the first and second members M1, M2 are turned respective angles $\theta b°$, $\theta c°$ in respective different directions about the first and second axes J1, J2, respectively, a line S2 of action extending from the second member M2 toward the first member M1, which has been aligned with the straight line N before the first and second members M1, M2 are turned, points to a position on the first member M1 which is spaced a distance "a1'" from the point P1, and is inclined to the first member M1 by an angle $\theta d°$.

In FIGS. 1A and 1B, therefore, when the first and second members M1, M2 are individually turned respective arbitrary angles in respective arbitrary directions, a member, e.g., a machining tool (not shown), mounted on the second member M2 and another member, e.g., a workpiece (not shown), mounted on the first member M1 can quickly be positioned as desired with respect to each other.

Figure 2A:
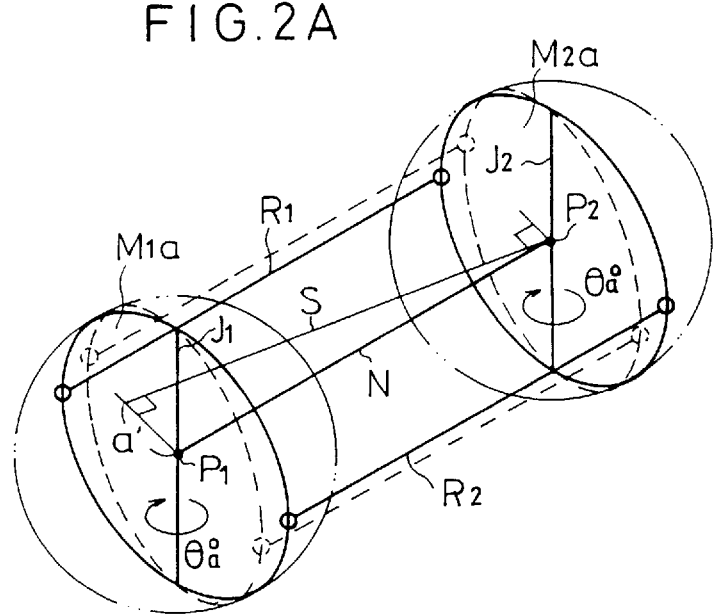
FIG. 2A is a schematic diagram illustrative of principles of the present invention, showing the first and second members which are interconnected by two rods and turned the same angle in the same direction.

As shown in FIG. 2A, first and second members M1a, M2a spaced from each other are interconnected by a connecting mechanism comprising two opposite rods R1, R2, and first and second axes J1, J2 which lie on the respective first and second members M1, M2 extend perpendicularly to a straight line N interconnecting points P1, P2 on the first and second members M1a, M2a and also extend respectively through the points P1, P2. A line S of action extends from the second member M2 toward the first member M1 and is aligned with the straight line N before the first and second members M1a, M2a are turned. When the first and second members M1a, M2a are turned an angle $\theta a°$ about the first and second axes J1, J2, respectively, the line S of action points to a position on the first member M1a which is spaced a distance "a'" from the point P1, and extends perpendicularly to the first member M1a.

Figure 2B:
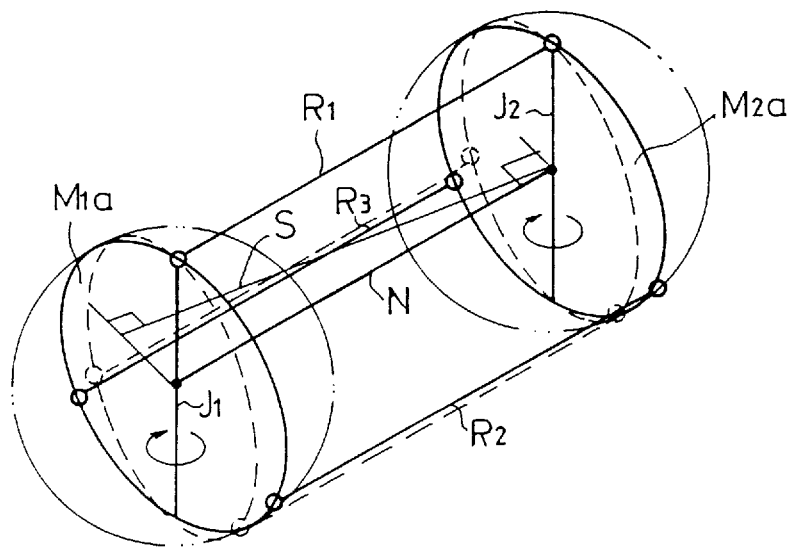
FIG. 2B is a schematic diagram illustrative of principles of the present invention, showing the first and second members which are interconnected by three rods and turned the same angle in the same direction.

As shown in FIG. 2B, the first and second members M1a, M2a are interconnected by a connecting mechanism comprising three angularly spaced rods R1, R2, R3. The first and second members M1a, M2a thus interconnected can be turned in unison with each other through the same angle about various axes while being maintained in parallel relationship to each other.

In FIGS. 2A and 2B, therefore, when the first and second members M1a, M2a are turned in unison with each other through respective arbitrary angles in respective arbitrary directions, a member, e.g., a machining tool (not shown), mounted on the second member M2 and another member, e.g., a workpiece (not shown), mounted on the first member M1 can quickly be positioned as desired with respect to each other.

FIG. 3 shows a machine tool 10 incorporating a relative positioning machine according to a first embodiment of the present invention.

As shown in FIG. 3, the machine tool 10 has a spindle 11 whose axis extends generally along a Z axis and to which a machining tool is attached, a first panel (first member) 12 whose plane lies in the directions indicated by the arrows B, C and extends perpendicularly across the axis of the spindle 11, a second panel (second member) 14 to which a workpiece W is secured and which is spaced downwardly from the first panel 12, first through fourth support mechanisms 16a, 16b, 18a, 18b by which the first and second panels 12, 14 are tiltably supported for angular movement respectively about an X1 axis (first axis) and an X2 axis (second axis) which extend parallel to the directions indicated by the arrow C and also respectively about a Y1 axis (third axis) and a Y2 axis (fourth axis) which extend parallel to the directions indicated by the arrow B and perpendicularly to the X1 and X2 axes, and first through fourth actuator mechanisms 20a, 20b, 22a, 22b for individually tilting the first and second panels 12, 14 about the X1 axis, the X2 axis, the Y1 axis, and the Y2 axis.

Figure 4:
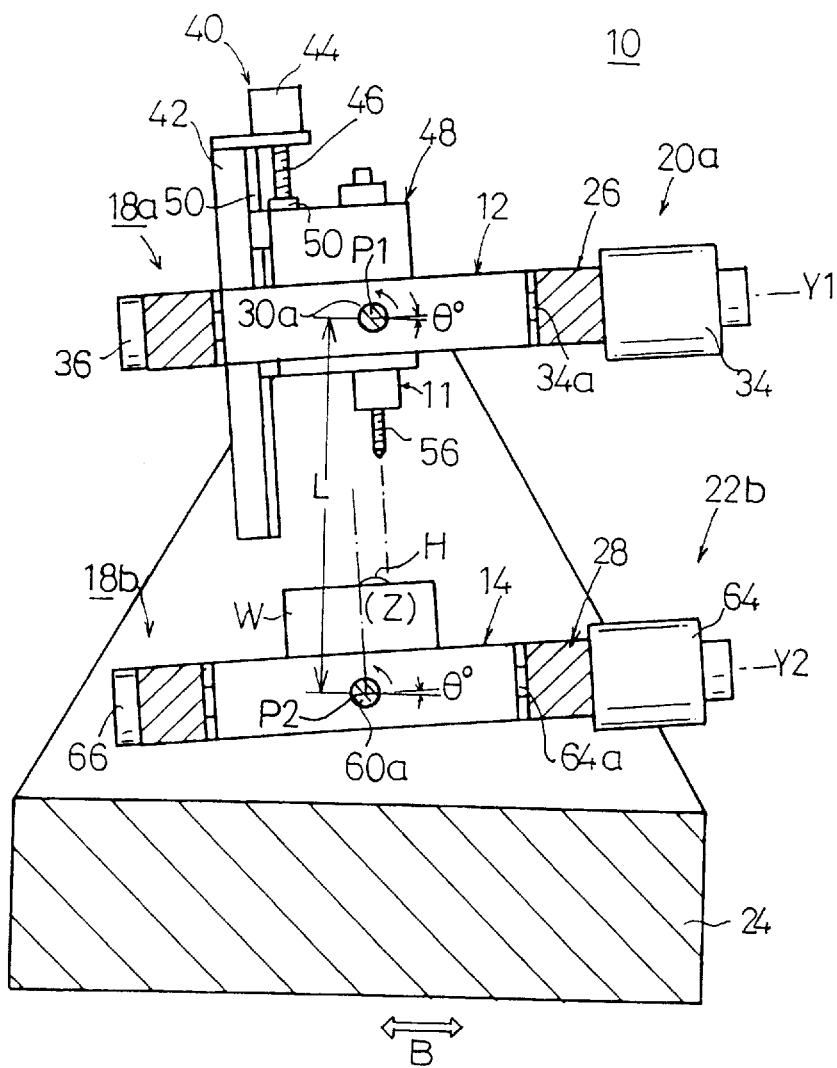
FIG. 4 is a cross-sectional view of the machine tool shown in FIG. 3, showing the position of the parts turned about X axes.
Figure 5:
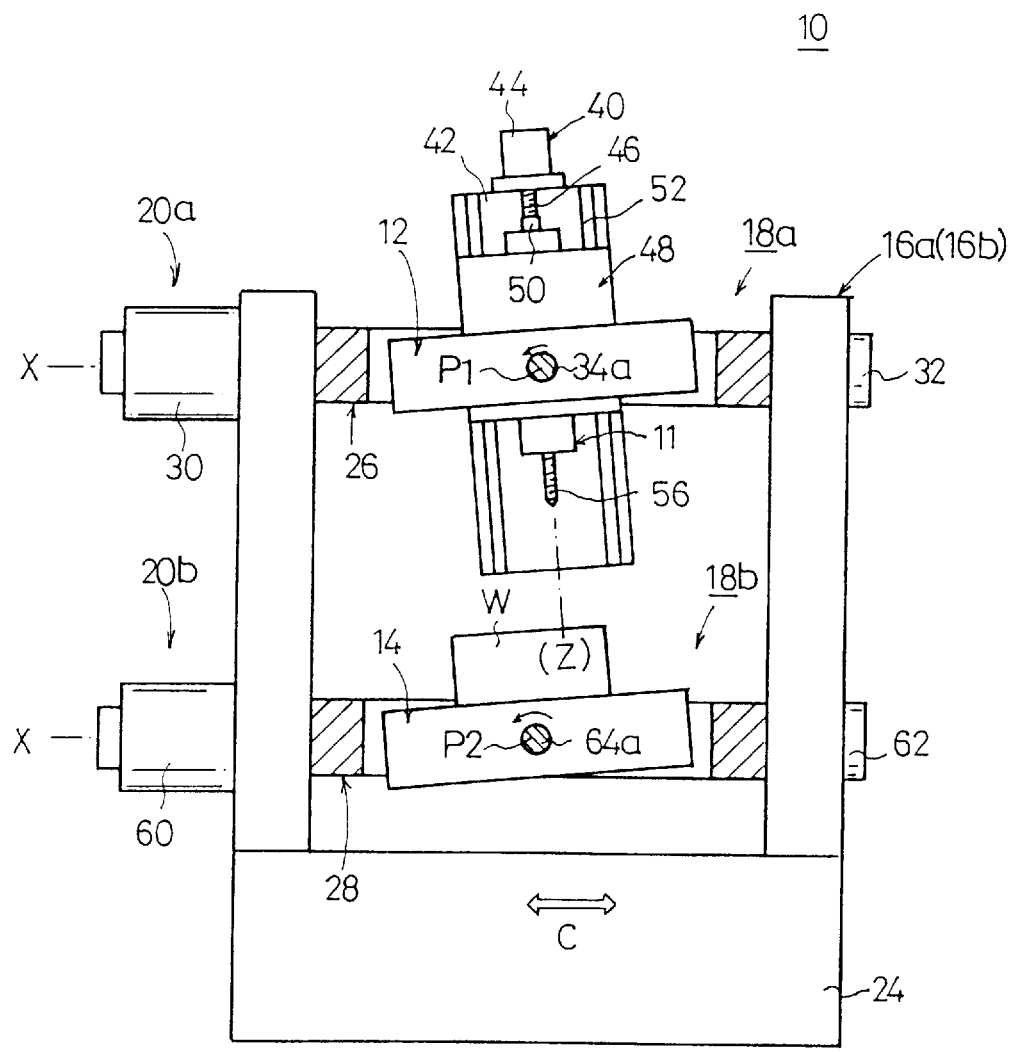
FIG. 5 is a cross-sectional view of the machine tool shown in FIG. 3, showing the position of the parts turned about Y axes.

As shown in FIGS. 3 through 5, the first and second support mechanisms 16a, 16b comprise a single common base 24, and the third and fourth support mechanisms 18a, 18b comprise respective first and second frames 26, 28 which are tiltably supported by the base 24 for angular movement about the X1 axis and the X2 axis, respectively, and by which the first and second panels 12, 14 are tiltably supported for angular movement about the Y1 axis and the Y2 axis, respectively.

The first actuator mechanism 20a comprises a first X-axis motor 30 fixed to an upper portion of the base 24 and a first shaft 32 mounted on an upper portion of the base 24 in axially aligned, opposite relationship to the first X-axis motor 30. The third actuator mechanism 22a comprises a first Y-axis motor 34 fixed to an end of the first frame 26 in the directions indicated by the arrow B and a second shaft 36 mounted on the first frame 26 in axially aligned, opposite relationship to the first Y-axis motor 34. The first X-axis motor 30 has a drive shaft 30a connected to the first frame 26, and the first shaft 32 is connected to the first frame 26 in axial alignment with the drive shaft 30a along the X1 axis. The first Y-axis motor 34 has a drive shaft 34a connected to the first panel 12, and the second shaft 36 is connected to the first panel 12 in axial alignment with the drive shaft 34a along the Y1 axis.

The first panel 12 is tiltably disposed in a rectangular opening 38 defined in the first frame 26 for angular movement about the Y1 axis in the rectangular opening 38. The first panel 12 supports thereon a Z-axis actuator mechanism 40 for moving the spindle 11 along the Z axis across the first panel 12 toward and away from the second panel 14. The Z-axis actuator mechanism 40 comprises a vertically elongate base 42 fixedly mounted on the first panel 12 and extending in the directions indicated by the arrow A, and a Z-axis motor 44 mounted on an upper end of the base 42. The Z-axis motor 44 has a downwardly directed drive shaft (not shown) to which there is coaxially coupled a ball screw 46 that extends in the directions indicated by the arrow A and is threaded through a nut 46. The nut 46 is mounted on a block 48 slidably mounted on a pair of vertical guide rails 52 fixed to the base 42.

The first panel 12 has an opening 54 complementary in shape to the block 48, which is vertically movable through the opening 54 across the first panel 12. The spindle 11 is vertically supported by the block 48 for rotation with respect to the block 48 about the Z axis. A machining tool 56 such as a drill bit is mounted on the lower end of the spindle 11. The assembly including the block 48 and the Z-axis actuator mechanism 40 has its center of gravity positioned at a center of rotation of the first panel 12, i.e., a point (i.e., a point P1 shown in FIGS. 4 and 5) of intersection between the X1 and Y1 axes.

The second actuator mechanism 20b, which is similar in structure to the first actuator mechanism 20a, comprises a second X-axis motor 60 fixed to a lower portion of the base 24 and a third shaft 62 mounted on a lower portion of the base 24 in axially aligned, opposite relationship to the second X-axis motor 60. The fourth actuator mechanism 22b, which is similar in structure to the third actuator mechanism 22a, comprises a second Y-axis motor 64 fixed to an end of the second frame 28 in the directions indicated by the arrow B and a fourth shaft 66 mounted on the second frame 28 in axially aligned, opposite relationship to the second Y-axis motor 64.

The second X-axis motor 60 has a drive shaft 60a connected to the second frame 28, and the third shaft 62 is connected to the second frame 28 in axial alignment with the drive shaft 60a along the X2 axis. The second Y-axis motor 64 has a drive shaft 64a connected to the second panel 14, and the fourth shaft 66 is connected to the second panel 14 in axial alignment with the drive shaft 64a along the Y2 axis. The second panel 14 is tiltably disposed in a rectangular opening 68 defined in the second frame 28 for angular movement about the Y2 axis in the rectangular opening 68. The second panel 14 supports thereon the workpiece W such that the center of gravity of the workpiece W is positioned at a center of rotation of the second panel 14, i.e., a point (i.e., a point P2 shown in FIGS. 4 and 5) of intersection between the X2 and Y2 axes.

As shown in FIG. 4, the first and second panels 12, 14 are individually angularly movable or swingable about the respective shafts 30a, 60a, i.e., the respective X1, X2 axes, which extend across a straight line interconnecting the points P1, P2 and pass through the points P1, P2. As shown in FIG. 5, the first and second panels 12, 14 are also individually angularly movable or swingable about the shafts 34a, 64a, i.e., the respective Y1, Y2 axes.

Operation of the machine tool 10 which incorporates the relative positioning machine according to the first embodiment of the present invention will be described below.

As shown in FIG. 3, the first and second panels 12, 14 are held horizontally, and the spindle 11 is rotated in one direction to rotate the drill bit 56 while at the same time the Z-axis actuator mechanism 40 is operated. The ball screw 46 is rotated about its own axis by the Z-axis motor 44, causing the nut 50 to move the block 48 and hence the spindle 11 downwardly along the guide rails 52. The rotating drill bit 56 now drills a hole at a predetermined position in the workpiece W mounted on the second panel 14.

After the hole has been drilled at the predetermined position in the workpiece W by the drill bit 56, the Z-axis motor 44 is reversed to cause the block 48 to move the spindle 11 upwardly away from the workpiece W, and then the relative position of the drill bit 56 with respect to the workpiece W is changed.

Specifically, if the workpiece W is to be drilled at a next position which is spaced away from the already drilled position parallel to the directions indicated by the arrow B, then the first X-axis motor 30 of the first actuator mechanism 20a is energized to cause the drive shaft 30a to tilt the first frame 26 through an angle θ° about the X1 axis, as shown in FIG. 4. At the same time, the second X-axis motor 60 of the second actuator mechanism 20b is energized to cause the drive shaft 60a to tilt the second frame 28 through the same angle θ° about the X2 axis, as shown in FIG. 4. The first and second panels 12, 14 are therefore tilted in unison with each other through the same angle θ° in the same direction.

As shown in FIG. 4, if the distance between the axis (the point P1) of the first X-axis motor 30 and the axis (the point P2) of the second X-axis motor 60 is represented by L, then a distance H by which the next position where the workpiece W is to be drilled by the drill bit 56 is spaced from the previously drilled position is expressed by H=L·sinθ. Therefore, distances between various positions to be drilled on the workpiece W can be determined when the distance L is preset and various angles θ° are selected for tilting the first and second panels 12, 14.

If the workpiece W is to be drilled at a next position which is spaced away from the already drilled position parallel to the directions indicated by the arrow C, then the first and second Y-axis motors 34, 64 of the second and fourth actuator mechanisms 22a, 22b are energized to tilt the first and second panels 12, 14 through a given angle about the respective Y1 and Y2 axes with respect to the first and second frames 26, 28, as shown in FIG. 5.

Figure 6:
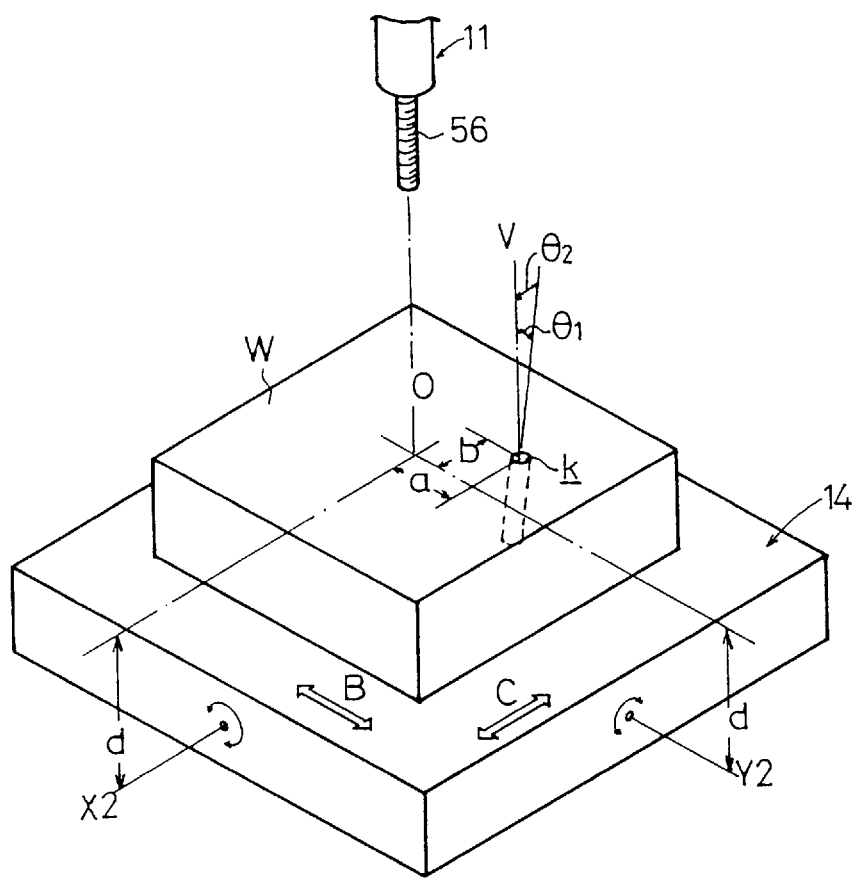
FIG. 6 is a schematic perspective view showing an inclined hole to be drilled in the workpiece.

If the workpiece W is to be drilled to form an inclined hole K (see FIG. 6) which is spaced a distance "a" from a central position O of the workpiece W in the directions indicated by the arrow B and inclined an angle θ1° to a vertical direction V and which is also spaced a distance "b" from the central position O in the directions indicated by the arrow C and inclined an angle θ2° to the vertical direction V, then the first and second panels 12, 14, i.e., the drill bit 56 and the workpiece W, are positioned relatively to each other as follows: In FIG. 6, a distance "d" represents a dimension from the center (i.e., the Y2 axis) of tilting movement of the second panel 14 to the surface to be machined of the workpiece W.

Figure 7:
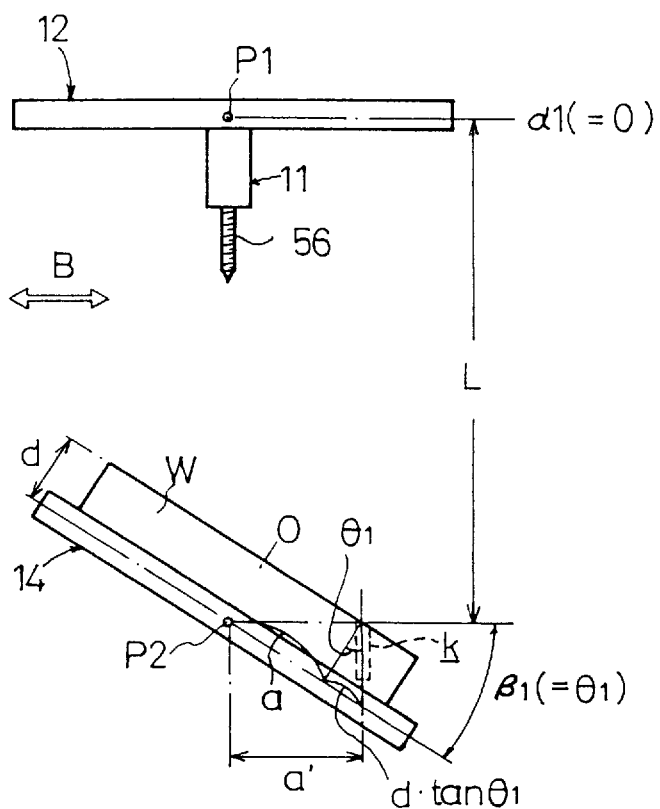
FIG. 7 is a schematic elevational view showing first and second panels of the machine tool, with only the second panel being tilted to meet an angle of inclination of the inclined hole in the directions of the arrow B.

First, it is assumed that, as shown in FIG. 7, while the first panel 12 is being maintained at a horizontal attitude (α1= 0°), the second panel 14 is tilted an angle β1 (=θ1°) downwardly from the horizontal direction until the axis of an inclined hole K to be drilled in the workpiece W is directed vertically.

A distance "a'" by which the axis of the inclined hole K is horizontally spaced from the central position O of the workpiece W is expressed by a'=(a+dtanθ1)cosθ1. Therefore, the angle α1 through which the first panel 12 is to be tilted is expressed by:

$$\alpha1=\sin^{-1}(a+d \tan \theta1) \cos \theta1/L \qquad (1)$$

The angle β1 through which the second panel 14 is to be tilted is expressed by:

$$\beta1=\theta1-\sin^{-1}(a+d \tan \theta1) \cos \theta1/L \qquad (2)$$

Figure 8:
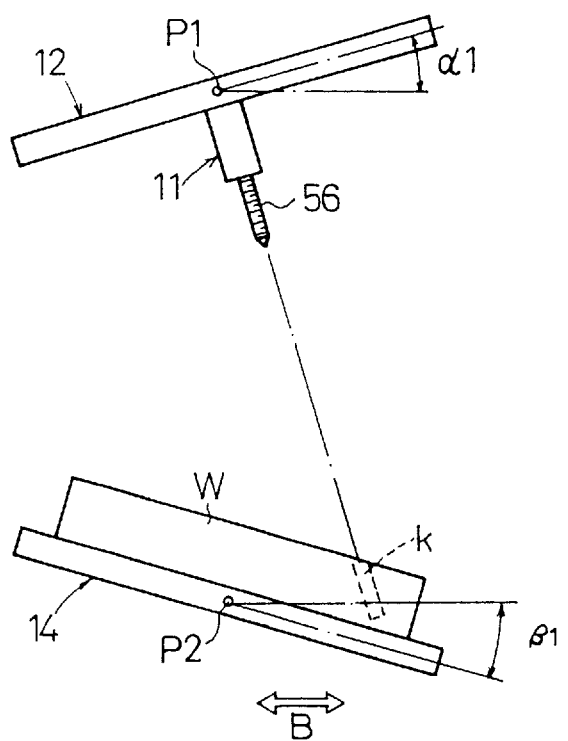
FIG. 8 is a schematic elevational view showing the first and second panels of the machine tool, with both the first and second panels being tilted to meet the angle of inclination of the inclined hole in the directions of the arrow B.

(see FIG. 8). The first and second panels 12, 14 are tilted the respective angles α1, β1 by the first and second actuator mechanisms 20a, 20b for thereby positioning the drill bit 56 and the workpiece W with respect to each other in the directions indicated by the arrow B.

Figure 9:
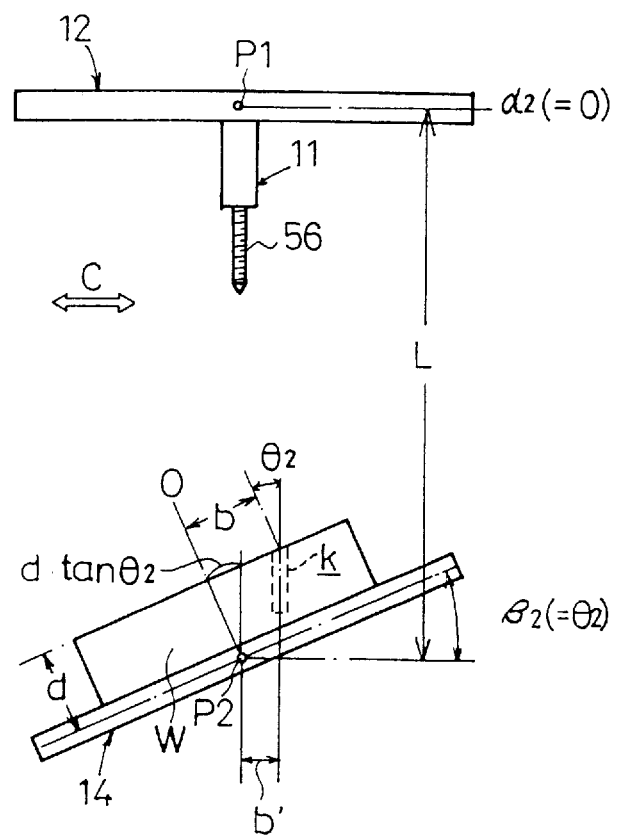
FIG. 9 is a schematic elevational view showing the first and second panels of the machine tool, with only the second panel being tilted to meet an angle of inclination of the inclined hole in the directions of the arrow C.

Then, it is assumed that, as shown in FIG. 9, while the first panel 12 is being maintained at a horizontal attitude (α2= 0°), the second panel 14 is tilted an angle β2 (=θ2°) upwardly from the horizontal direction until the axis of an inclined hole K to be drilled in the workpiece W is directed vertically.

A distance "b'" by which the axis of the inclined hole K is horizontally spaced from the central position O of the workpiece W is expressed by b'=(b−dtanθ2)cosθ2.

Therefore, the angle α2 through which the first panel 12 is to be tilted is expressed by:

$$\alpha2=\sin^{-1}(b-d \tan \theta2) \cos \theta2/L \qquad (3)$$

The angle β2 through which the second panel 14 is to be tilted is expressed by:

$$\beta2=\theta2+\sin^{-1}(b-d \tan \theta2) \cos \theta2/L \qquad (4)$$

Figure 10:
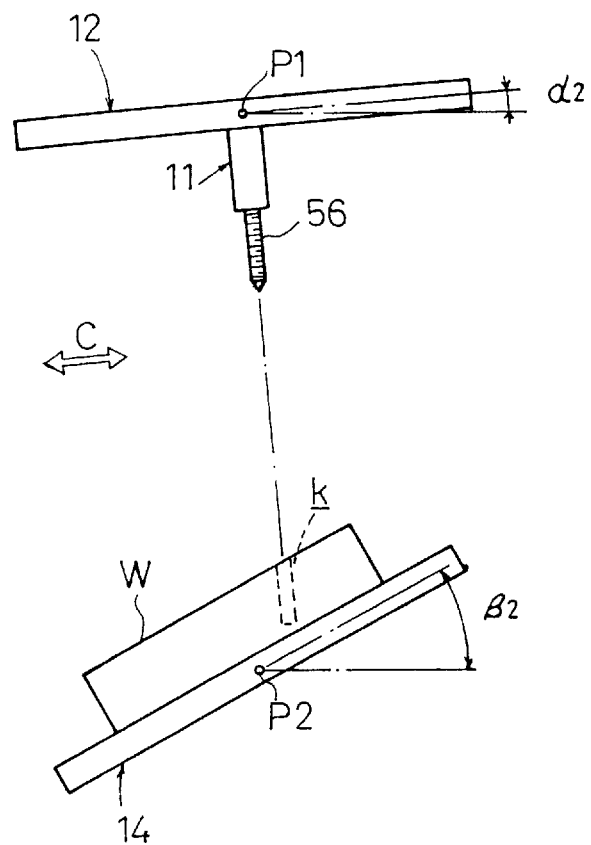
FIG. 10 is a schematic elevational view showing the first and second panels of the machine tool, with both the first and second panels being tilted to meet the angle of inclination of the inclined hole in the directions of the arrow C.

(see FIG. 10). The first and second panels 12, 14 are tilted the respective angles α2, β2 by the third and fourth actuator mechanisms 22a, 22b for thereby positioning the drill bit 56 and the workpiece W with respect to each other in the directions indicated by the arrow C.

In the first embodiment, as described above, the center of gravity of the assembly including the block 48 and the Z-axis actuator mechanism 40 is positioned at the center of rotation of the first panel 12, i.e., the point P1, and the center of gravity of the workpiece W is positioned at the center of rotation of the second panel 14, i.e. the point P2. For moving from one position to another where the workpiece W is to be drilled by the drill bit 56, the first through fourth actuator mechanisms 20a, 20b, 22a, 22b are operated to turn the first and second panels 12, 14 individually both two-dimensionally and three-dimensionally.

As a result, because the block 48 is not horizontally moved in the directions indicated by the arrows B, C unlike the conventional positioning structure, no substantial inertia is developed by the moving parts, but the drill bit 56 and the workpiece W can reliably and smoothly be positioned relatively to each other with very small forces. The first through fourth actuator mechanisms 20a, 20b, 22a, 22b may be highly small in size, and the drill bit 56 and the workpiece W can quickly be positioned relatively to each other.

The first and second panels 12, 14 can be tilted independently of each other through different angles, respectively. Even if the workpiece W needs to be machined in different areas whose axes are oriented or inclined in different directions, those areas can be machined efficiently and quickly.

While in the first embodiment the first and second panels 12, 14 are tiltable individually about the X1, X2 axes and the Y1, Y2 axes, the first and second panels 12, 14 may be tiltable only about the X1, X2 axes, respectively.

Figure 11:
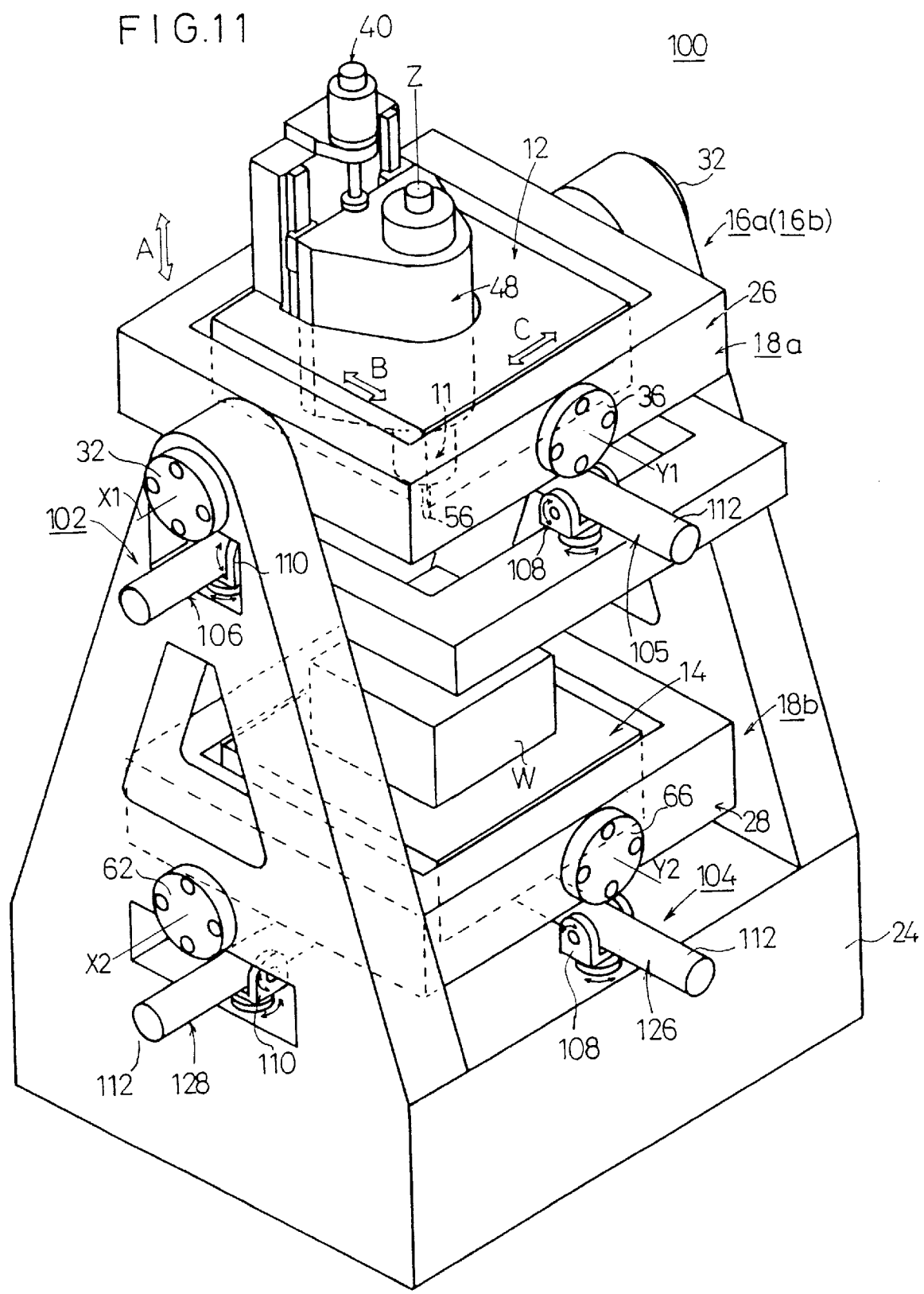
FIG. 11 is a perspective view of a machine tool which incorporates a relative positioning machine according to a second embodiment of the present invention.
Figure 12:
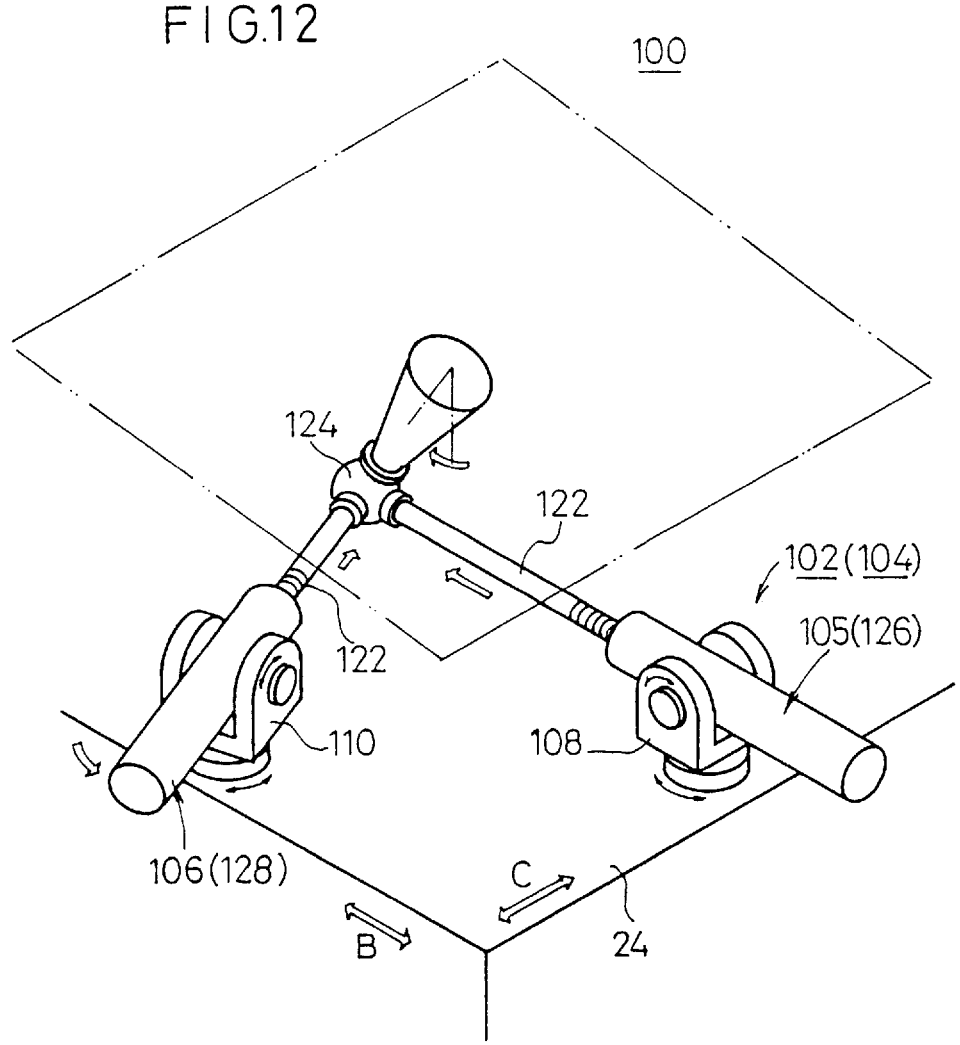
FIG. 12 is a perspective view of each of first and second actuator mechanisms of the machine tool shown in FIG. 11.
Figure 13:
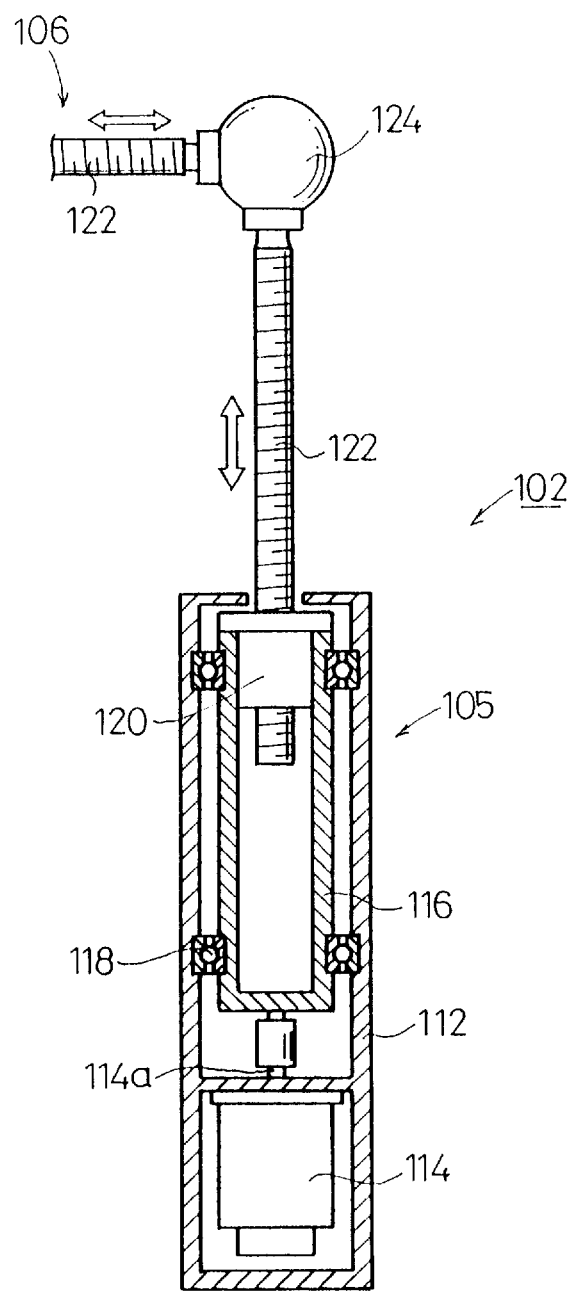
FIG. 13 is a cross-sectional view of each of the first and second actuator mechanisms.

FIGS. 11 through 13 show a machine tool 100 which incorporates a relative positioning machine according to a second embodiment of the present invention. Those parts of the machine tool 100 which are identical to those of the machine tool 10 according to the first embodiment are denoted by identical reference characters, and will not be described in detail below.

The machine tool 100 has first and second actuator mechanisms 102, 104 in place of the first through fourth actuator mechanisms 20a, 20b, 22a, 22b according to the first embodiment. The first actuator mechanism 102 is operatively coupled to the first panel 12, and comprises a first ball screw assembly 105 and a second ball screw assembly 106 which are swingably supported on the base 24 by attachments 108, 110 for swinging movement in horizontal and vertical directions.

As shown in FIG. 13, the first ball screw assembly 105 has a casing 112 supported on the attachment 108 and a motor 114 housed in the casing 112. The motor 114 has a drive shaft 114a coupled coaxially to a rotary tube 116 which is rotatably supported in the casing 112 by bearings 118. A nut 120 is fixedly mounted in the rotary tube 116 and threaded over a ball screw 122 which has an outer end connected to a ball joint 124 that projects downwardly from a lower surface of the first panel 12. When the first panel 12 is kept in a horizontal attitude, the first ball screw assembly 105 extends in the directions indicated by the arrows B, and the second ball screw assembly 106 extends in the directions indicated by the arrows C.

The second ball screw assembly 106 has the same structure as the first ball screw assembly 105. Therefore, those parts of the second ball screw assembly 106 which are identical to those of the first ball screw assembly 105 are denoted by identical reference characters, and will not be described in detail below.

The second actuator mechanism 104 is operatively coupled to the second panel 14, and comprises a third ball screw assembly 126 and a fourth ball screw assembly 128 which are swingably supported on the base 24 by attachments 108, 110 for swinging movement in horizontal and vertical directions. The third and fourth ball screw assemblies 126, 128 are identical in structure to the first and second ball screw assemblies 105, 106. Therefore, those parts of the third and fourth ball screw assemblies 126, 128 which are identical to those of the first and second ball screw assemblies 105, 106 are denoted by identical reference characters, and will not be described in detail below.

In operation, the first ball screw assembly 105 of the first actuator mechanism 102 is actuated. Specifically, as shown in FIG. 13, the motor 114 is energized to rotate the drive shaft 114a and the rotary tube 116 in unison with each other. The nut 120 fixedly mounted on the rotary tube 116 is rotated, enabling the ball screw 122 threaded through the nut 120 to move axially in directions into and out of the casing 112.

If the ball screw 122 axially moves in the direction out of the casing 112, as shown in FIG. 12, then the ball joint 124 coupled to the ball screw 122 tilts the first panel 12 about the X1 axis (see FIG. 11) through shafts 32 by which the first frame 26 and hence the first panel 12 are supported on the base 24. As the ball joint 124 moves with the ball screw 122, the second ball screw assembly 106 is turned in the direction indicated by the arrow with its ball screw 122 extending out in the direction indicated by the arrow. The first panel 12 is tilted about the X1 axis. The drill bit 56 mounted on the spindle 11 is thus tilted about the X1 axis.

In the second embodiment, the first and second actuator mechanisms 102, 104 are operated to turn the first and second panels 12, 14 individually both two-dimensionally and three-dimensionally. Consequently, the drill bit 56 can quickly and easily be positioned relatively to any of various areas on the workpiece W for drilling those areas.

A machine tool 200 which incorporates a relative positioning machine according to a third embodiment of the present invention will be described below with reference to FIGS. 14 through 19.

Figure 14:
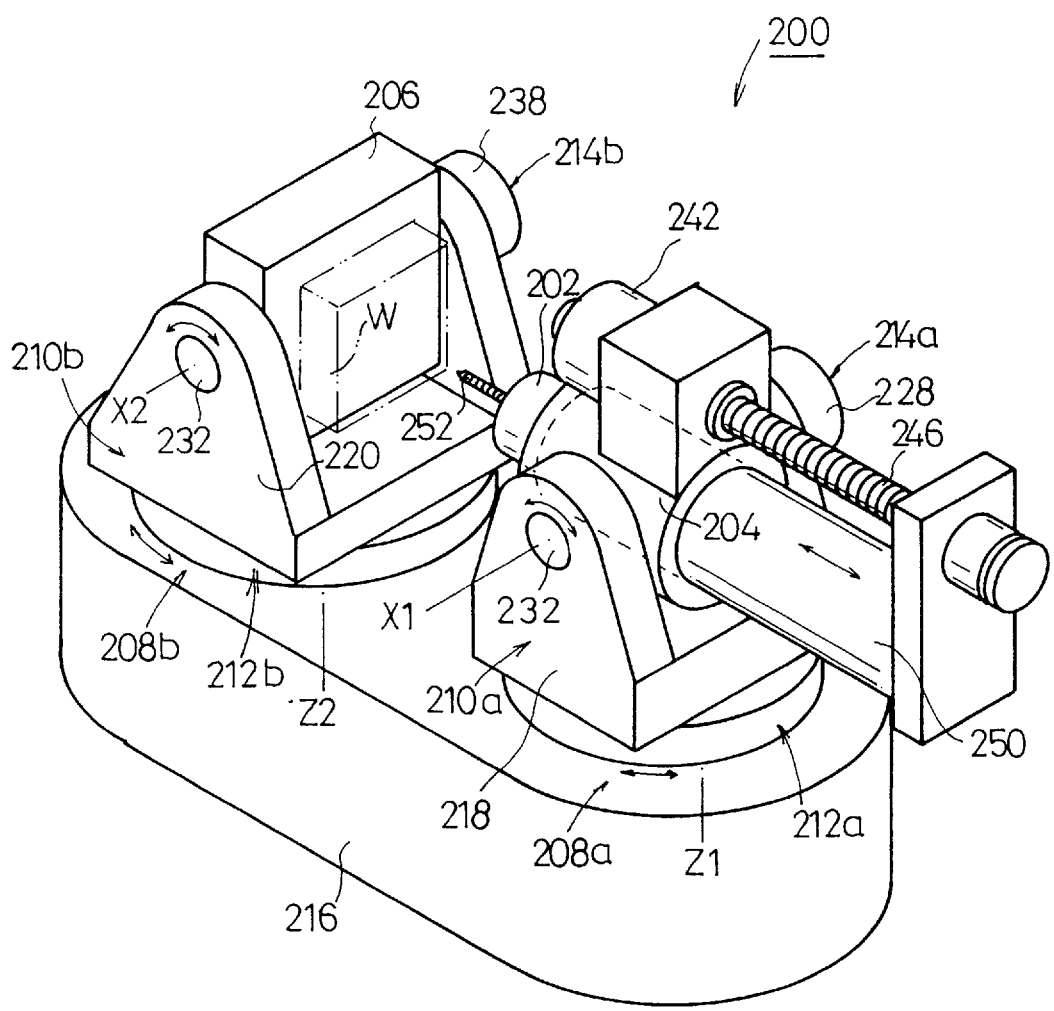
FIG. 14 is a perspective view of a machine tool which incorporates a relative positioning machine according to a third embodiment of the present invention.
Figure 15:
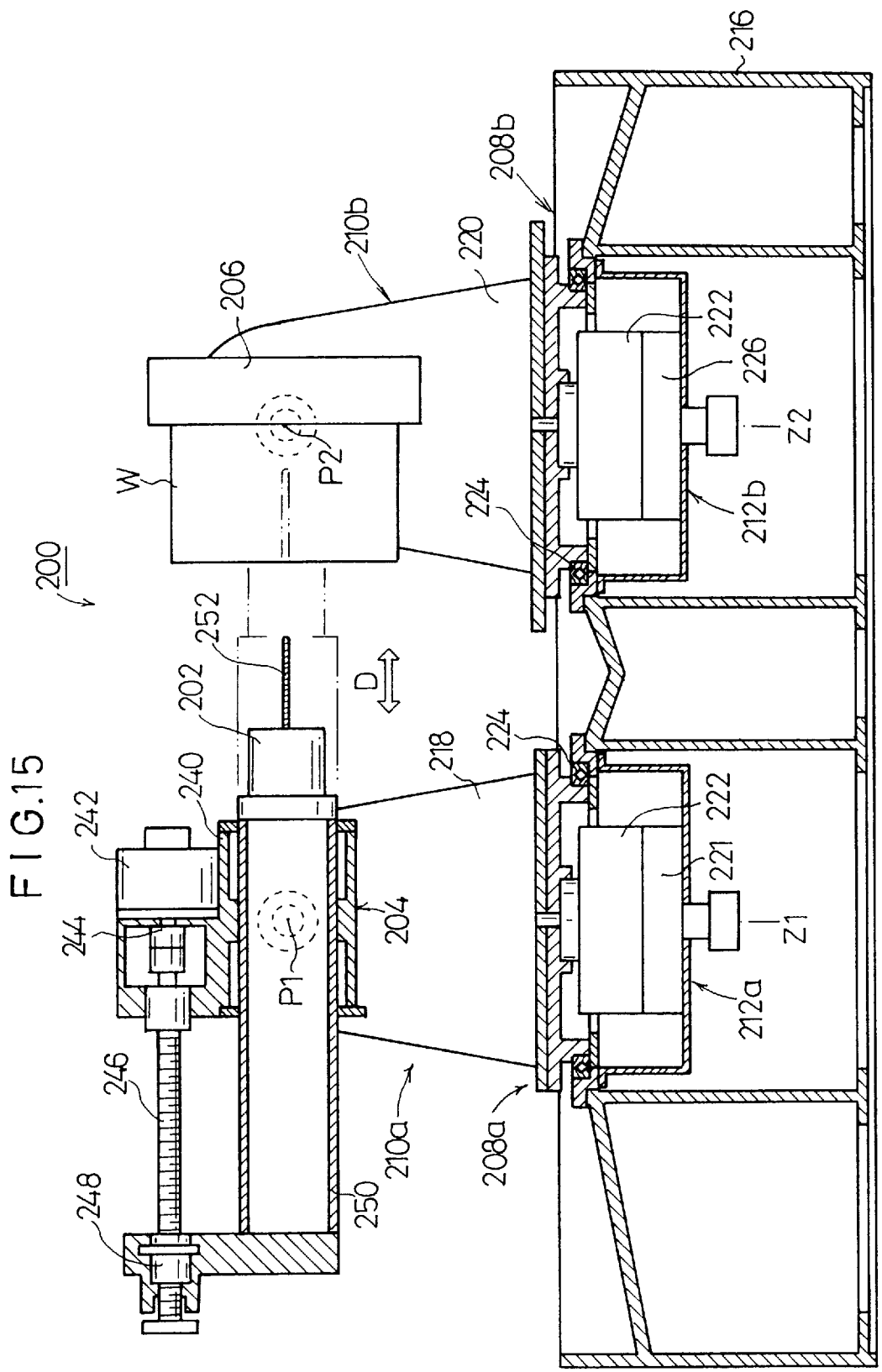
FIG. 15 is a vertical cross-sectional view of the machine tool shown in FIG. 14.
Figure 16:
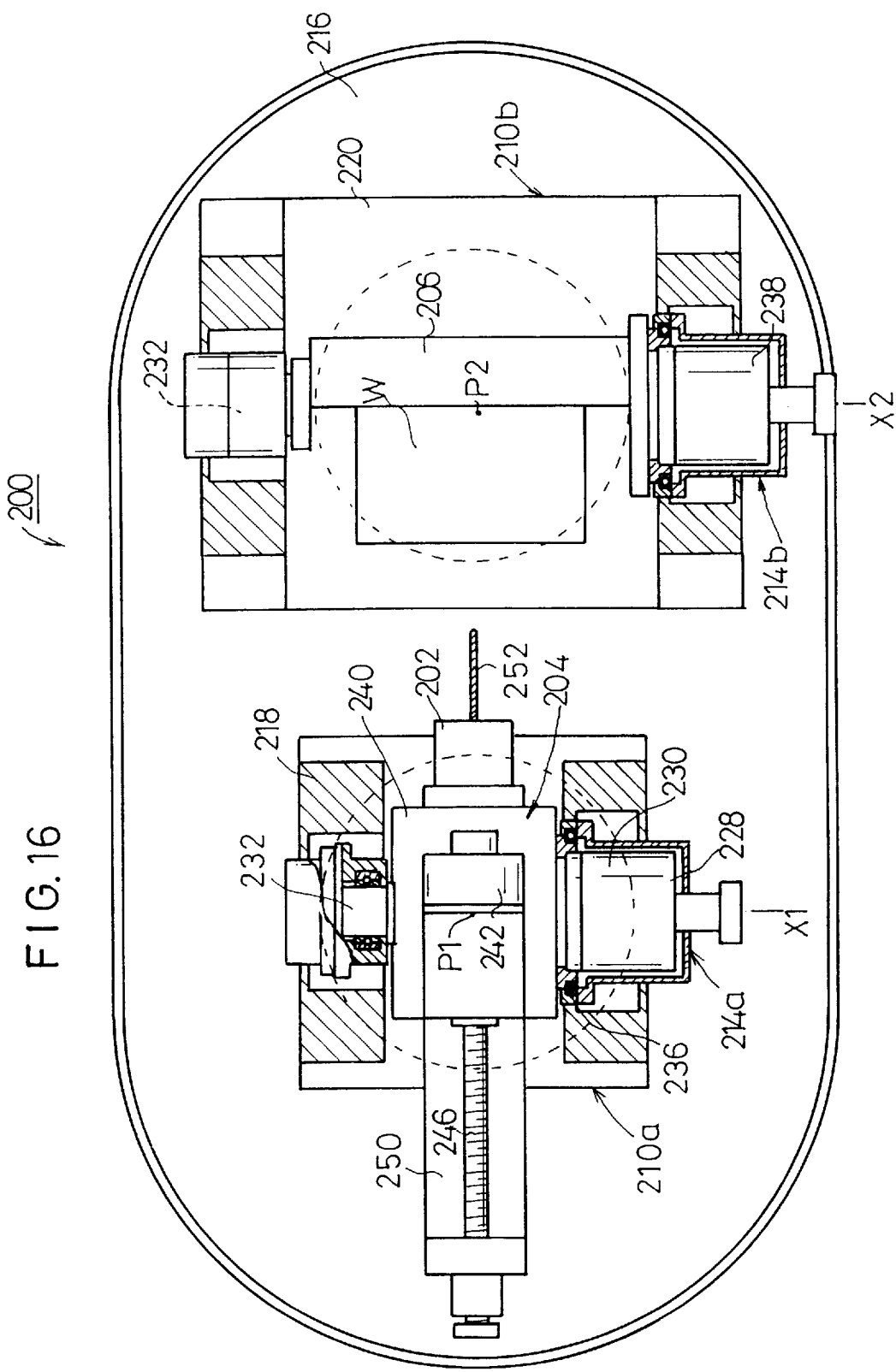
FIG. 16 is a horizontal cross-sectional view of the machine tool shown in FIG. 14.

As shown in FIGS. 14 through 16, the machine tool 200 comprises a first attachment (first member) 204 supporting a spindle 202, a second attachment (second member) 206 supporting a workpiece W, first through fourth support mechanisms 208a, 208b, 210a, 210b by which the first and second attachments 204, 206 are tiltably supported for angular movement about respective Z1, Z2 axes and respective X1, X2 axes, and first through fourth actuator mechanisms 212a, 212b, 214a, 214b for angularly moving and tilting the first and second attachments 204, 206 about the respective Z1, Z2 axes and the respective X1, X2 axes.

The first and second support mechanisms 208a, 208b comprise a single common base 216, and the third and fourth support mechanisms 210a, 210b comprise respective first and second rotary bases 218, 220 which are rotatably supported on the base 216 for angular movement about the Z1 axis and the Z2 axis, respectively.

As shown in FIG. 15, the first actuator mechanism 212a comprises a first Z-axis motor 221 disposed in an upper portion of the base 216 and having a rotary tube 222 to which the first rotary base 218 is fixed with a bearing 224 interposed between the first rotary base 218 and the base 216. The second actuator mechanism 212b, which is similar in structure to the first actuator mechanism 212a, comprises a second Z-axis motor 226 disposed in an upper portion of the base 216 and having a rotary tube 222 to which the second rotary base 220 is fixed with a bearing 224 interposed between the second rotary base 220 and the base 216.

As shown in FIGS. 14 and 16, the third actuator mechanism 214a has a first X-axis motor 228 fixedly mounted on an upper portion of the first rotary base 218 in axial alignment with the X1 axis. The first X-axis motor 228 has a rotary tube 230 fixed to a side of the first attachment 204, but rotatably supported on the first rotary base 218 by a bearing 236. A first shaft 232 fixed to an opposite side of the first attachment 204 is rotatably supported on the first rotary base 218.

The fourth actuator mechanism 214b, which is similar in structure to the third actuator mechanism 214a, has a second X-axis motor 238 fixedly mounted on an upper portion of the second rotary base 220 in axial alignment with the X2 axis. Those parts of the fourth actuator mechanism 214b which are identical to those of the third actuator mechanism 214a are denoted by identical reference characters, and will not be described in detail below.

The first attachment 204 comprises a hollow cylinder 240 which supports on its upper portion a motor 242 for moving the spindle 202 in the directions indicated by the arrow D (FIG. 15) toward and away from the workpiece W mounted on the second attachment 206. As shown in FIG. 15, the motor 242 has a drive shaft 244 coupled coaxially to a ball screw 246 which is threaded in a nut 248 that is fixedly held in an end of a holder 250. The holder 250 is telescopically fitted in the cylinder 240, and supports the spindle 202 rotatably on an end thereof remote from the nut 248. A machining tool 252 such as a drill bit is mounted on the spindle 202.

As shown in FIG. 15, the first and second attachments 204, 206 are individually rotatable, by the respective first and second actuator mechanisms 212a, 212b, about the respective Z1, Z2 axes which extend perpendicularly to a straight line interconnecting two points P1, P2 and pass through the two points P1, P2, respectively. As shown in FIG. 16, the first and second attachments 204, 206 are also individually rotatable about the respective X1, X2 axes by the respective third and fourth actuator mechanisms 214a, 214b.

Accordingly, the machine tool 200 is basically similar in principle to the machine tool 10 according to the first embodiment. Operation of the machine tool 200 will be described below also with reference to FIGS. 17 through 19.

As shown in FIGS. 15 and 16, the first attachment 204 is maintained horizontally, and the second attachment 206 is kept vertically. The motor 242 is energized to rotate the ball screw 246 coupled to the drive shaft 244, causing the nut 248 threaded over the ball screw 246 to move the holder 250 toward the workpiece W. When the spindle 202 supported by the holder 250 is rotated, the drill bit 252 is also rotated to drill a hole in a desired area of the workpiece W which is supported on the second attachment 206.

Figure 17:
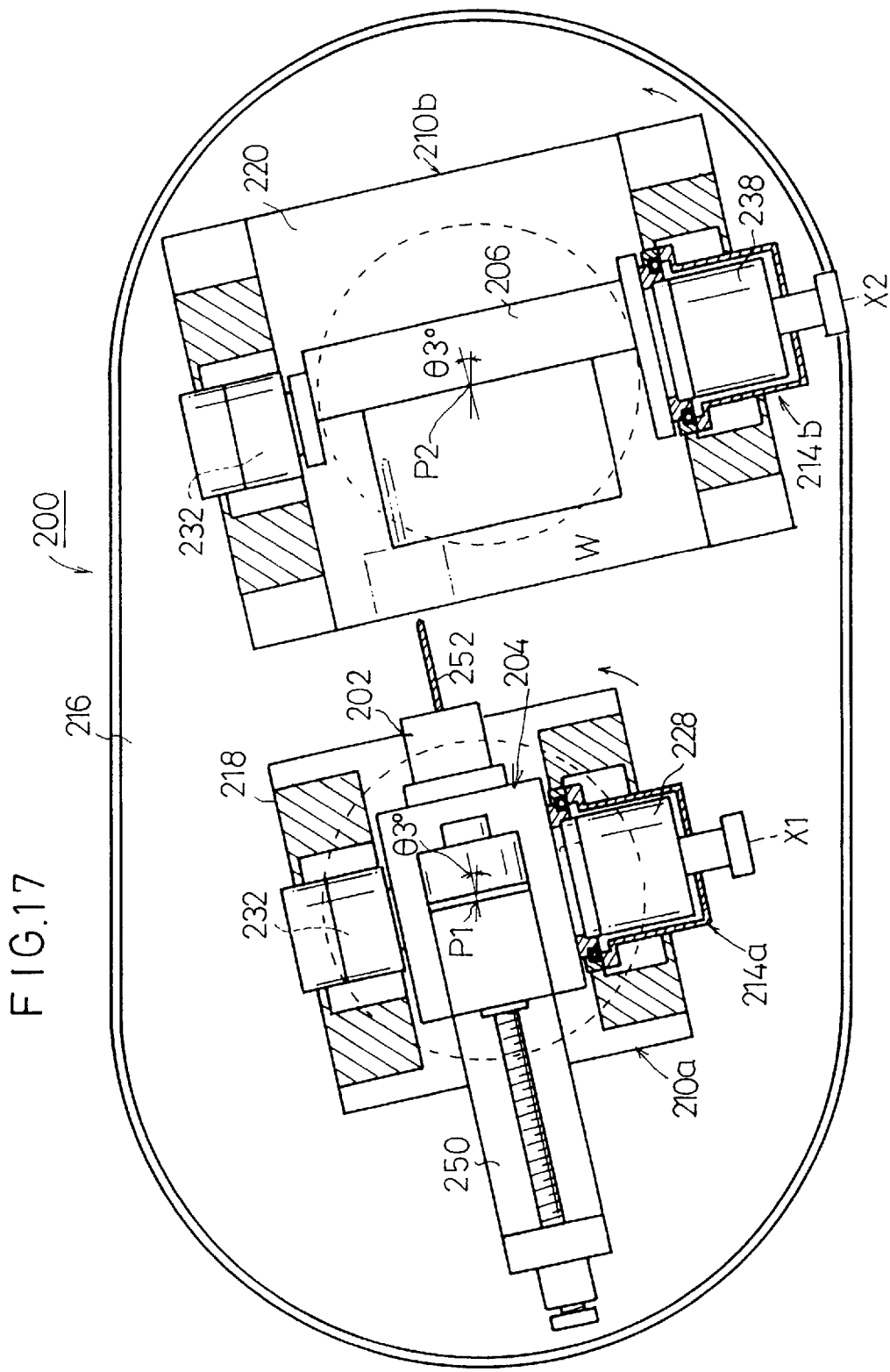
FIG. 17 is a horizontal cross-sectional view of the machine tool shown in FIG. 14, illustrating the manner in which a horizontal hole is drilled in a lateral area of a workpiece by the machine tool.

For drilling the workpiece W at an area thereof which is spaced horizontally from and parallel to the previously drilled hole, as shown in FIG. 17, the first Z-axis motor 221 of the first actuator mechanism 212a and the second Z-axis motor 226 of the second actuator mechanism 212b are energized to turn the first and second rotary bases 218, 220 through the same angle θ3° in the same direction.

Figure 18:
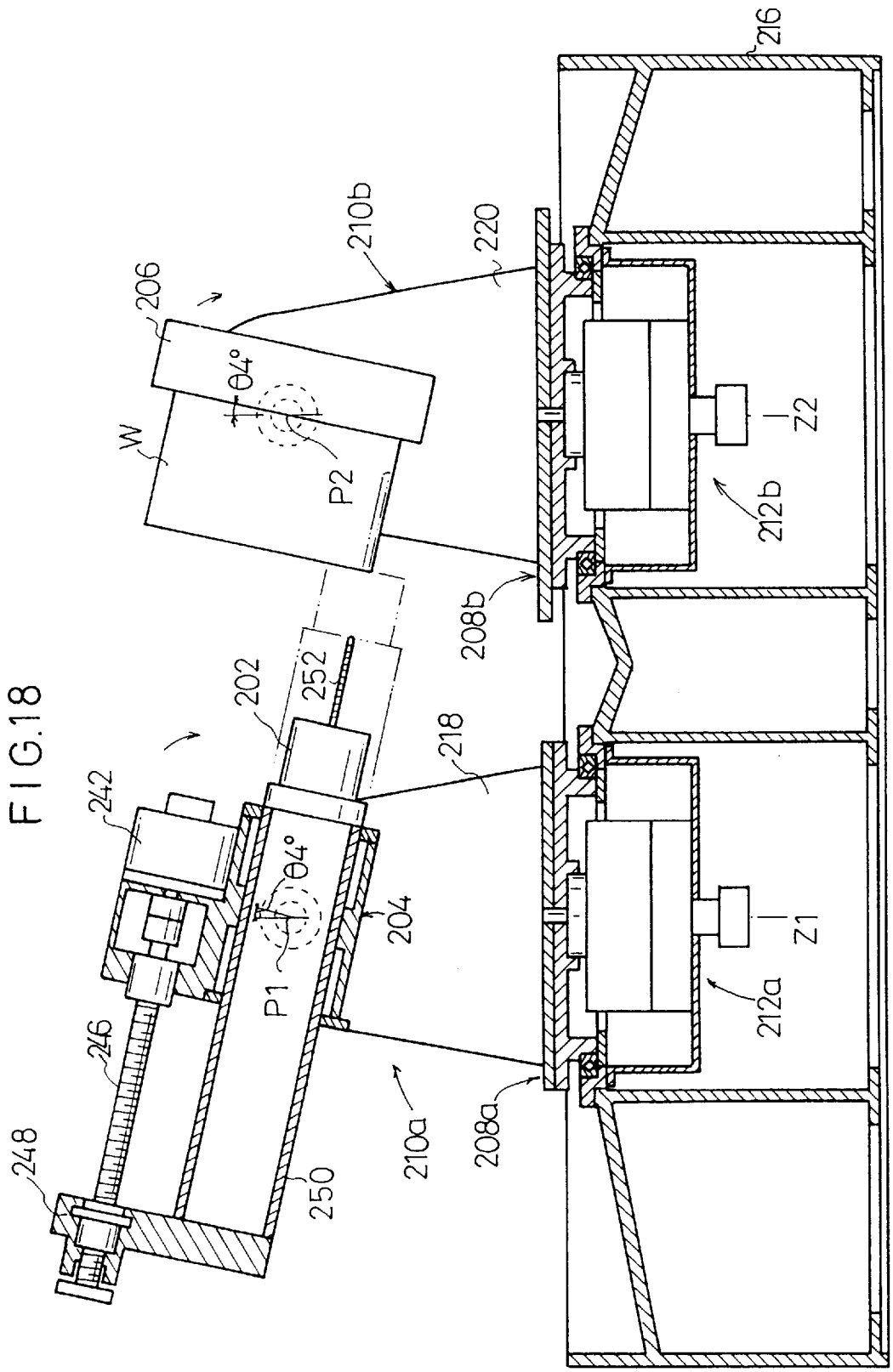
FIG. 18 is a vertical cross-sectional view of the machine tool shown in FIG. 14, illustrating the manner in which a horizontal hole is drilled in a lower area of a workpiece by the machine tool.

For drilling the workpiece W at an area thereof which is spaced downwardly from and parallel to the previously drilled hole, as shown in FIG. 18, the first X-axis motor 228 of the third actuator mechanism 214a and the second X-axis motor 238 of the fourth actuator mechanism 214b are energized to turn the first and second attachments 204, 206 vertically through the same angle θ4° in the same direction. The drill bit 252 is now directed toward a lower area of the workpiece W.

Figure 19:
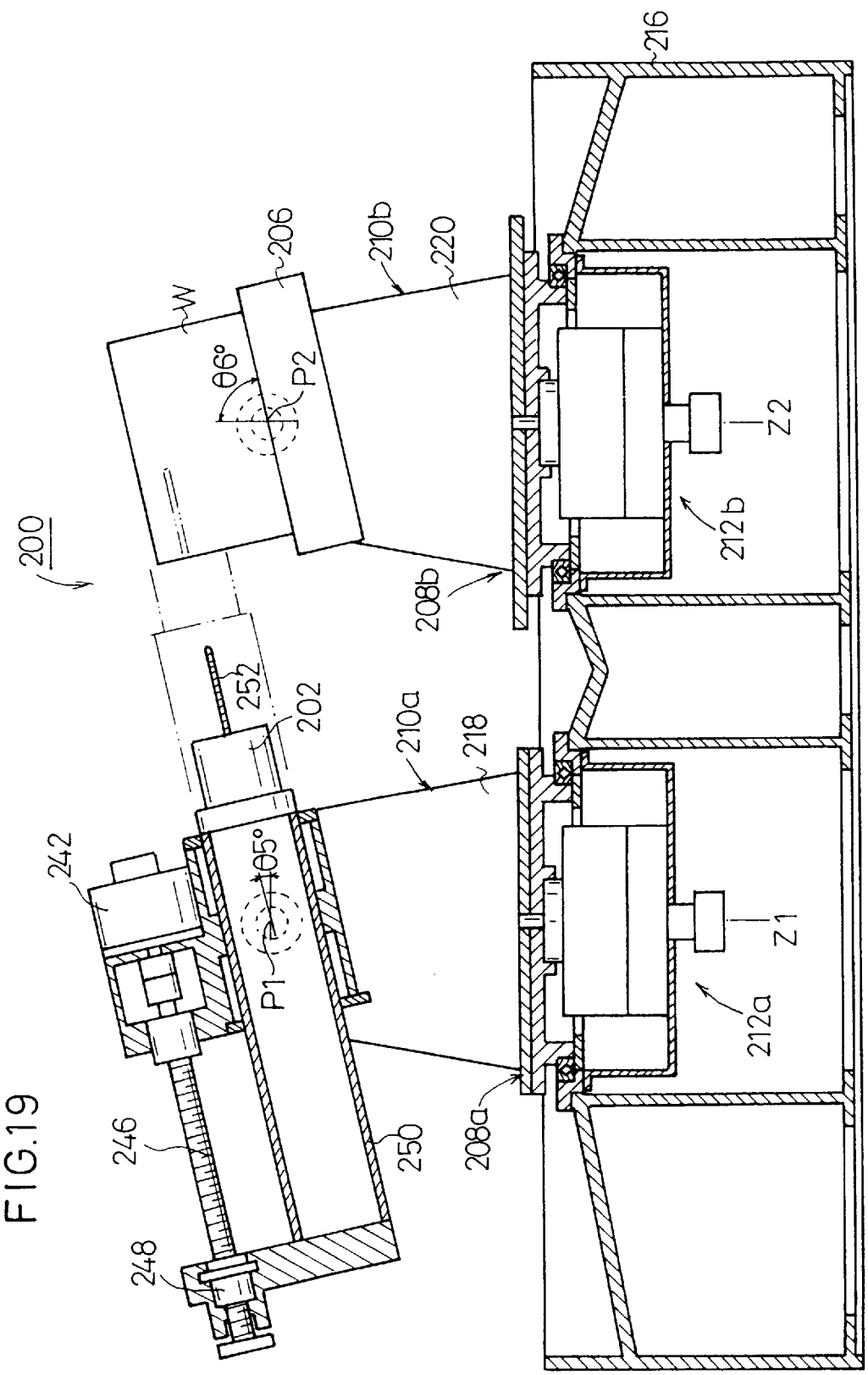
FIG. 19 is a vertical cross-sectional view of the machine tool shown in FIG. 14, illustrating the manner in which a vertical hole is drilled in a side of a workpiece by the machine tool.

For drilling a vertical hole in a side of the workpiece W, as shown in FIG. 19, the first attachment 204 is tilted vertically a given angle θ5° by the third actuator mechanism 214a, and the second attachment 206 is tilted vertically a large angle θ6° by the fourth actuator mechanism 214b.

For drilling various areas of the workpiece W which are oriented in various directions, the first through fourth actuator mechanisms 212a, 212b, 214a, 214b are operated to position the drill bit 252 quickly and easily with respect to the workpiece W. Consequently, the machine tool 200 offers the same advantages as the machine tool 10 according to the first embodiment.

Figure 20:
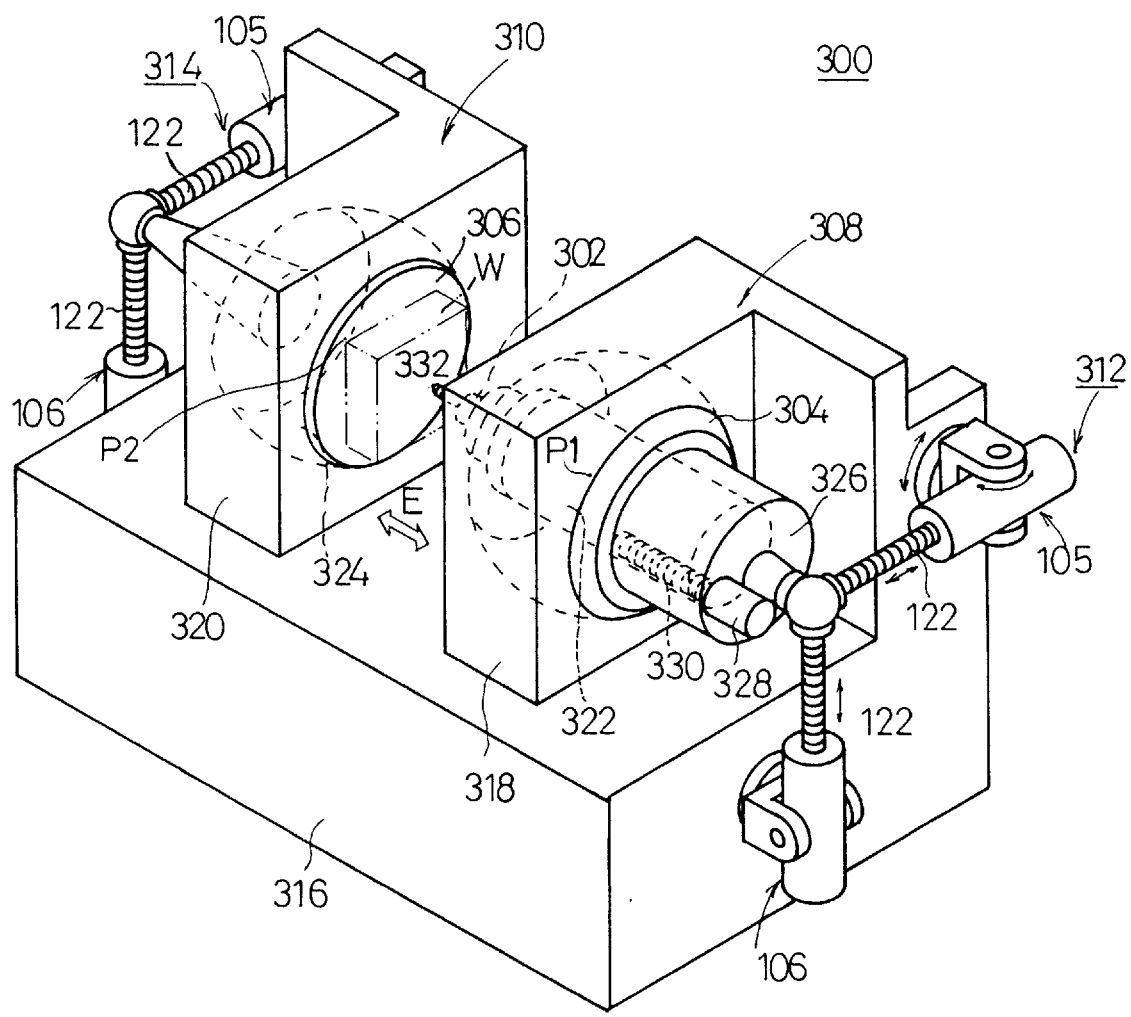
FIG. 20 is a perspective view of a machine tool which incorporates a relative positioning machine according to a fourth embodiment of the present invention.

FIG. 20 shows a machine tool 300 which incorporates a relative positioning machine according to a fourth embodiment of the present invention. As shown in FIG. 20, the machine tool 300 has a first attachment sphere (first member) 304 supporting a spindle 302, a second attachment sphere (second member) 306 supporting a workpiece W, first and second support mechanisms 308, 310 by which the first and second attachment spheres 304, 306 are tiltably supported for angular movement about various axes which extend perpendicularly to a straight line interconnecting two points P1, P2 and also extend respectively through the points P1, P2, and first and second actuator mechanisms 312, 314 for individually tilting the first and second attachment spheres 304, 306 about the various axes.

The first and second support mechanisms 308, 310 make up respective spherical pairs with the first and second attachment spheres 304, 306, and have respective first and second supports 318, 320 mounted on a base 316. The first and second attachment spheres 304, 306 are slidably fitted in respective first and second spherical inner surfaces 322, 324 which are defined respectively in the first and second supports 318, 320. A cylindrical holder 326 is mounted on the first attachment sphere 304 and supports thereon a motor 328 whose drive shaft is coupled coaxially to a ball screw 330. The spindle 302 is operatively connected to the ball screw 330 for axial movement in the directions indicated by the arrow E when the ball screw 330 is rotated by the motor 328. A machining tool 332 such as a drill bit is mounted on the spindle 302.

The first and second actuator mechanisms 312, 314 are identical respectively to the first and second actuator mechanisms 102, 104 of the machine tool 100 according to the second embodiment (see FIGS. 11 through 13). Those parts of the first and second actuator mechanisms 312, 314 which are identical to those of the first and second actuator mechanisms 102, 104 are denoted by identical reference numerals, and will not be described in detail below.

In the machine tool 300 according to the fourth embodiment, since the first and second support mechanisms 308, 310 make up respective spherical pairs with the first and second attachment spheres 304, 306, the drill bit 332 supported by the first attachment sphere 304 and the workpiece W supported by the second attachment sphere 306 are individually tiltable about various axes passing through the points P1, P2. Accordingly, the drill bit 332 and the workpiece W can easily and quickly be positioned relatively to each other, and such relative positioning capability is effective for the drill bit 332 to drill holes at different angles in different positions on the workpiece W.

Figure 21:
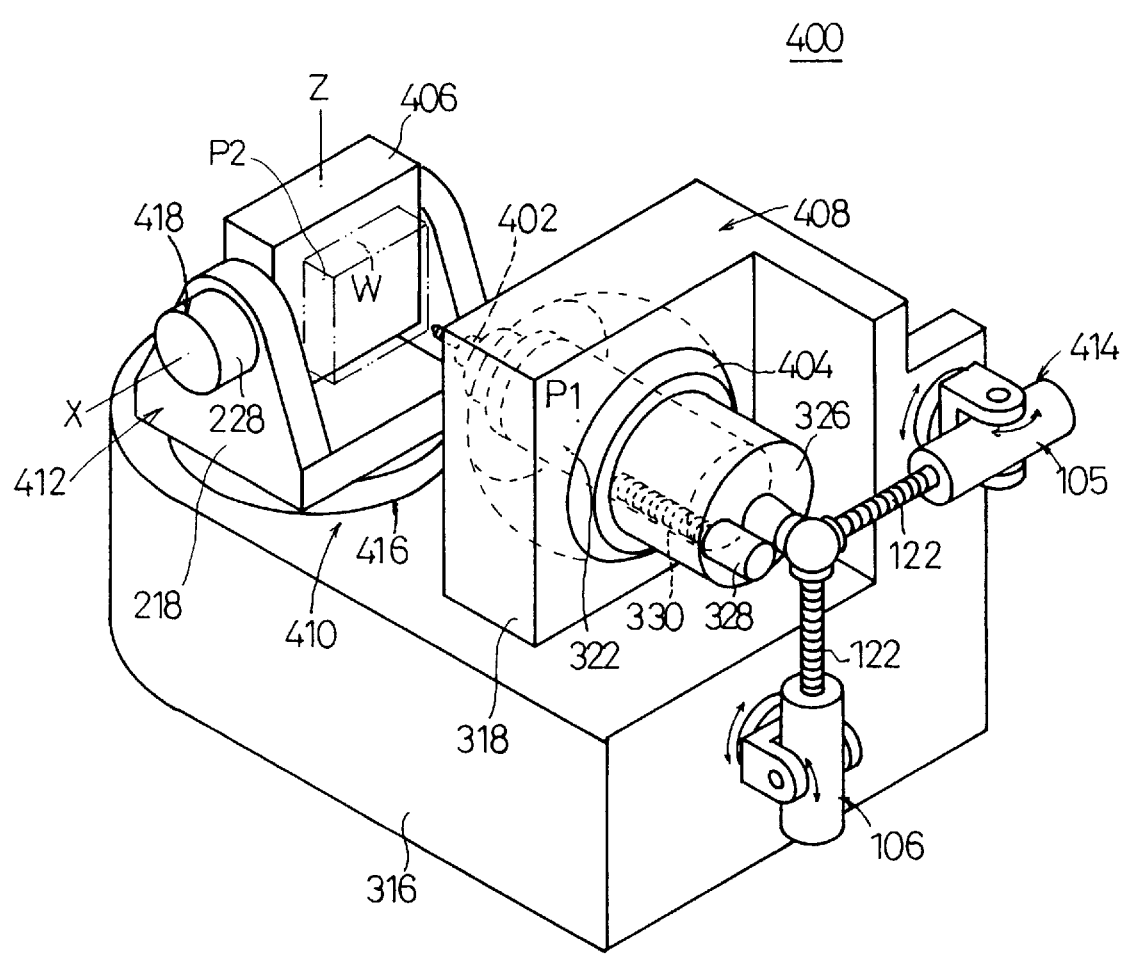
FIG. 21 is a perspective view of a machine tool which incorporates a relative positioning machine according to a fifth embodiment of the present invention.

FIG. 21 shows a machine tool 400 which incorporates a relative positioning machine according to a fifth embodiment of the present invention. As shown in FIG. 21, the machine tool 400 has an attachment sphere (first member) 404 supporting a spindle 402, an attachment (second member) 406 supporting a workpiece W, a sphere support mechanism (first support mechanism) 408 by which the attachment sphere 404 is tiltably supported for angular movement about various axes which extend perpendicularly to a straight line interconnecting two points P1, P2 and also extend through the point P1, a Z-axis support mechanism (second support mechanism) 410 by which the attachment 406 is rotatably supported for rotation about a Z axis (first axis), an X-axis support mechanism (third support mechanism) 412 by which the attachment 406 is rotatably supported for rotation about an X axis (second axis), a sphere actuator mechanism (first actuator mechanism) 414 for tilting the attachment sphere 404 about the various axes, and a Z-axis actuator mechanism (second actuator mechanism) 416 and an X-axis actuator mechanism (third actuator mechanism) 418 for individually rotating and tilting the attachment 406 respectively about the Z axis and the X axis.

The sphere support mechanism 408 and the sphere actuator mechanism 414 are identical respectively to the first support mechanism 308 and the first actuator mechanism 313 of the machine tool 300 according to the fourth embodiment, and the Z-axis support mechanism 410, the X-axis support mechanism 412, the Z-axis actuator mechanism 416, and the X-axis actuator mechanism 418 are identical respectively to the second support mechanism 208b, the fourth support mechanism 210b, the second actuator mechanism 212b, and the fourth actuator mechanism 214b of the machine tool 200 according to the third embodiment. Those parts of the mechanisms according to the fifth embodiment which are identical to those of the mechanisms according to the fourth and third embodiments are denoted by identical reference characters, and will not be described in detail below.

The machine tool 400 which incorporates the relative positioning machine according to the fifth embodiment can perform the same functions as those of both the machine tools 200, 300 according to the third and fourth embodiments of the present invention. Accordingly, the machine tool 400 allows the drill bit mounted on the spindle 402 and the workpiece W to be efficiently and easily positioned relatively to each other for quick subsequent machining operation on the workpiece W with the drill bit.

Figure 22:
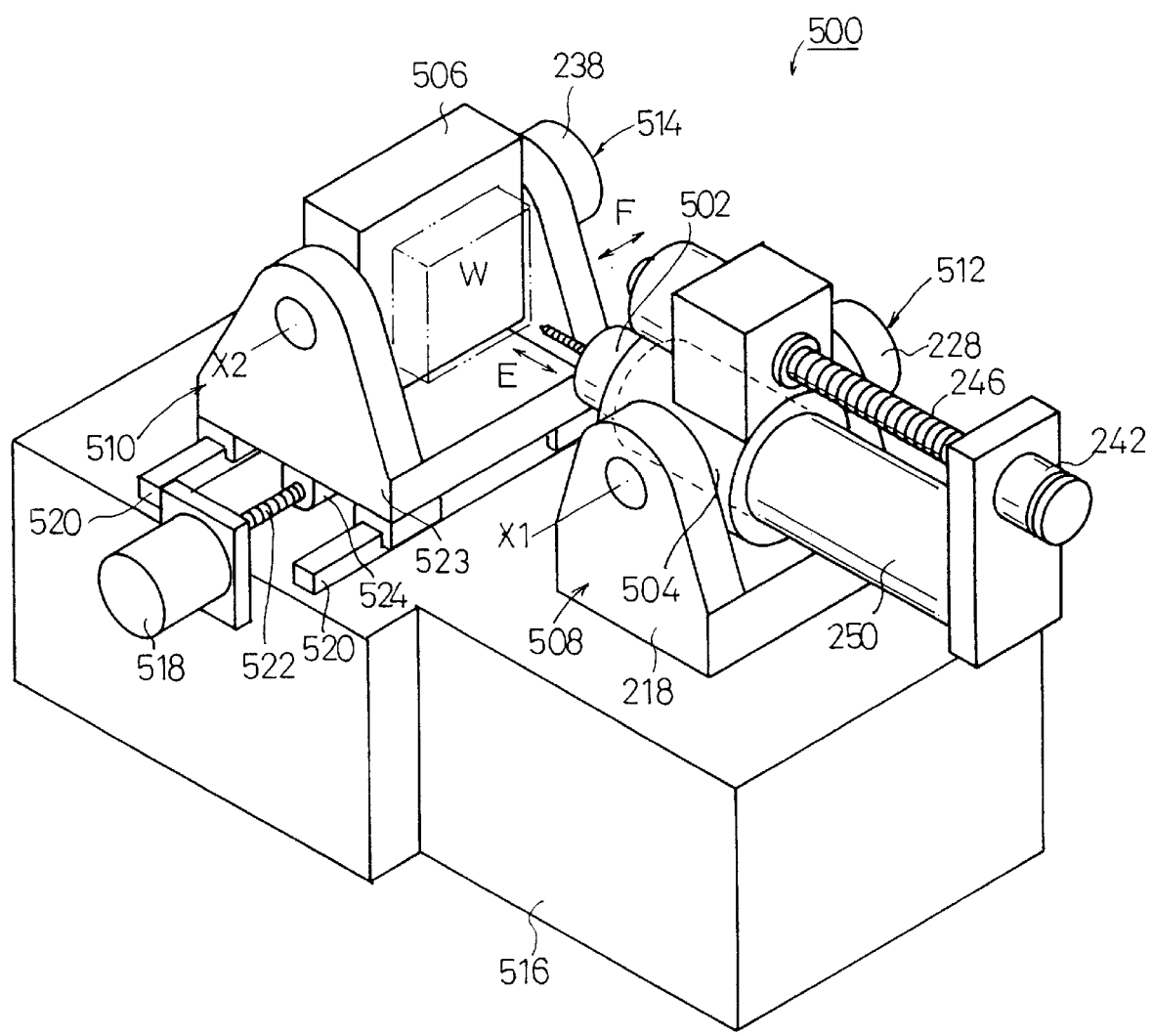
FIG. 22 is a perspective view of a machine tool which incorporates a relative positioning machine according to a sixth embodiment of the present invention.

FIG. 22 shows a machine tool 500 which incorporates a relative positioning machine according to a sixth embodiment of the present invention. Those parts of the machine tool 500 which are identical to those of the machine tool 200 according to the third embodiment are denoted by identical reference characters, and will not be described in detail below.

As shown in FIG. 22, the machine tool 500 comprises a first attachment (first member) 504 supporting a spindle 502, a second attachment (second member) 506 supporting a workpiece W, a first support mechanism 508 by which the first attachment 504 is tiltably supported for angular movement about an X1 axis (first axis), a second support mechanism 510 by which the second attachment 506 is tiltably supported for angular movement about an X2 axis (second axis), and first and second actuator mechanisms 512, 514 for individually tilting the first and second attachments 504, 506 about the respective X1, X2 axes.

The machine tool 500 has a base 516 supporting a motor (actuating means) 518 and a pair of guide rails 520. The motor 518 has a drive shaft coupled coaxially to a balls screw 522 extending in the directions indicated by the arrow F. The ball screw 522 is threaded through a nut 524 mounted on a lower surface of a movable base 523 of the second support mechanism 510. The movable base 523 is slidably mounted on the guide rails 520, and can be moved back and forth in the directions indicated by the arrow F along the guide rails 520 by the motor 518. In the machine tool 500, the first attachment 504 is tiltable about the X1 axis, and the second attachment 506 is both tiltable about the X2 axis and movable in the directions indicated by the arrow F by the motor 518. Therefore, the machine tool 500 is actuated by a relatively simple structure, and can quickly machine the workpiece W as desired.

Figure 23:
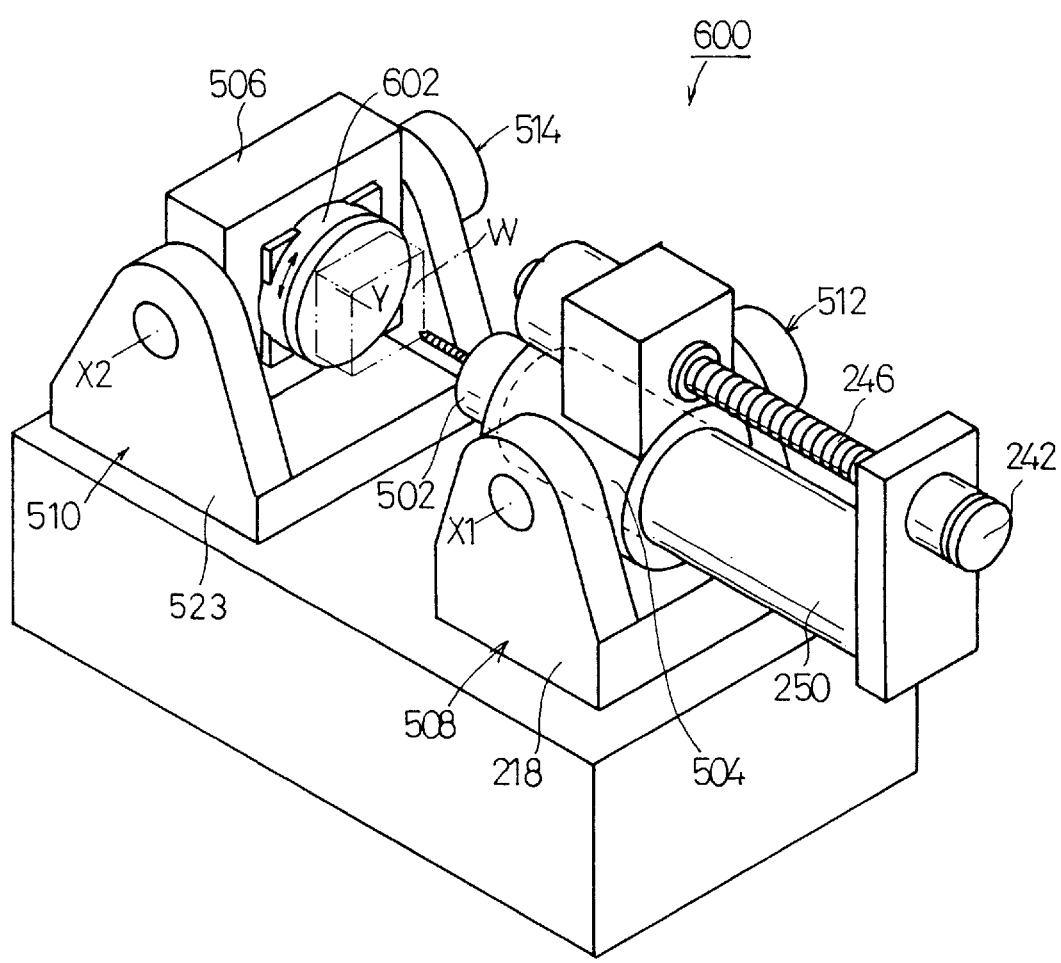
FIG. 23 is a perspective view of a machine tool which incorporates a relative positioning machine according to a seventh embodiment of the present invention.

FIG. 23 shows a machine tool 600 which incorporates a relative positioning machine according to a seventh embodiment of the present invention. Those parts of the machine tool 500 which are identical to those of the machine tool 500 according to the sixth embodiment are denoted by identical reference characters, and will not be described in detail below.

As shown in FIG. 23, the second attachment 506 of the machine tool 600 has a turntable 602 which is rotatable in the directions indicated by the arrow by a motor (not shown), and a workpiece W is fixedly mounted on the turntable 602. The first attachment 504 is tiltable about the X1 axis, and the second attachment 506 is tiltable about the X2 axis with the workpiece W being rotatable about a Y axis by the turntable 602. Therefore, the machine tool 600 is capable of quickly machine the workpiece W in various ways, as with the sixth embodiment.

In each of the first through seventh embodiments, the drill bit is used as the machining tool to machine the workpiece W. However, any of various other machining tools may be used to machine the workpiece W.

Figure 24:
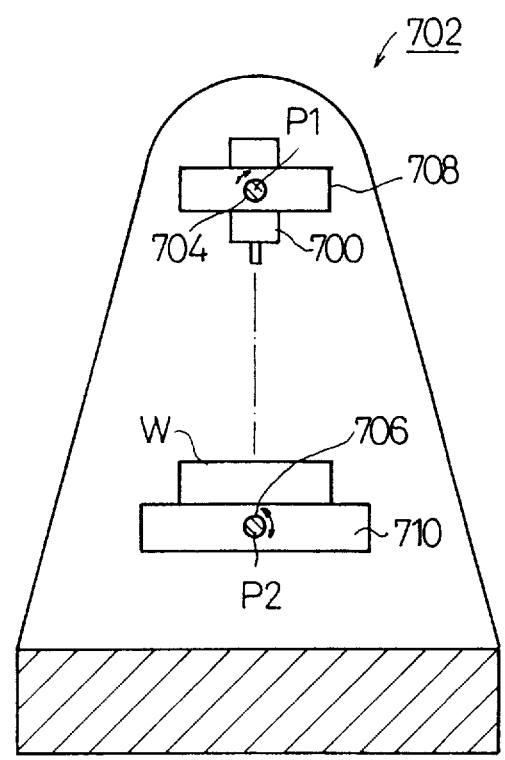
FIG. 24 is a perspective view of a laser beam machining apparatus which incorporates a relative positioning machine according to an eighth embodiment of the present invention.

For example, FIG. 24 shows a laser beam machining apparatus 702 which incorporates a relative positioning machine according to an eighth embodiment of the present invention. The laser beam machining apparatus 702 has a laser beam machining head 700 as the machining tool. The laser beam machining apparatus 702 comprises first and second panels (first and second members) 708, 710 which can individually be turned about respective first and second shafts 704, 706 that extend across a straight line N interconnecting points P1, P2 and also extend respectively through the points P1, P2.

Although not shown specifically, the first and second shafts 704, 706 can be rotated by respective mechanisms which are identical to the first and second actuator mechanisms 20*a*, 20*b* of the machine tool 10 according to the first embodiment of the present invention.

The laser beam machining head 700 is fixed to the first panel 708. When the first and second panels 708, 710 are individually tilted respective angles in respective directions, the laser beam machining head 700 is directed to any of various machining areas on the workpiece W at any of various angles with respect thereto. Accordingly, the laser beam machining head 700 can quickly and easily machine the workpiece W.

The laser beam machining apparatus 702 may be of the same structure as any of the machine tools 10, 100, 200, 300, 400, 500, 600 according to the first through seventh embodiments described above. Furthermore, the principles of the present invention shown in FIG. 24 are also applicable to a water jet machining apparatus having a water jet machining head.

Figure 25:
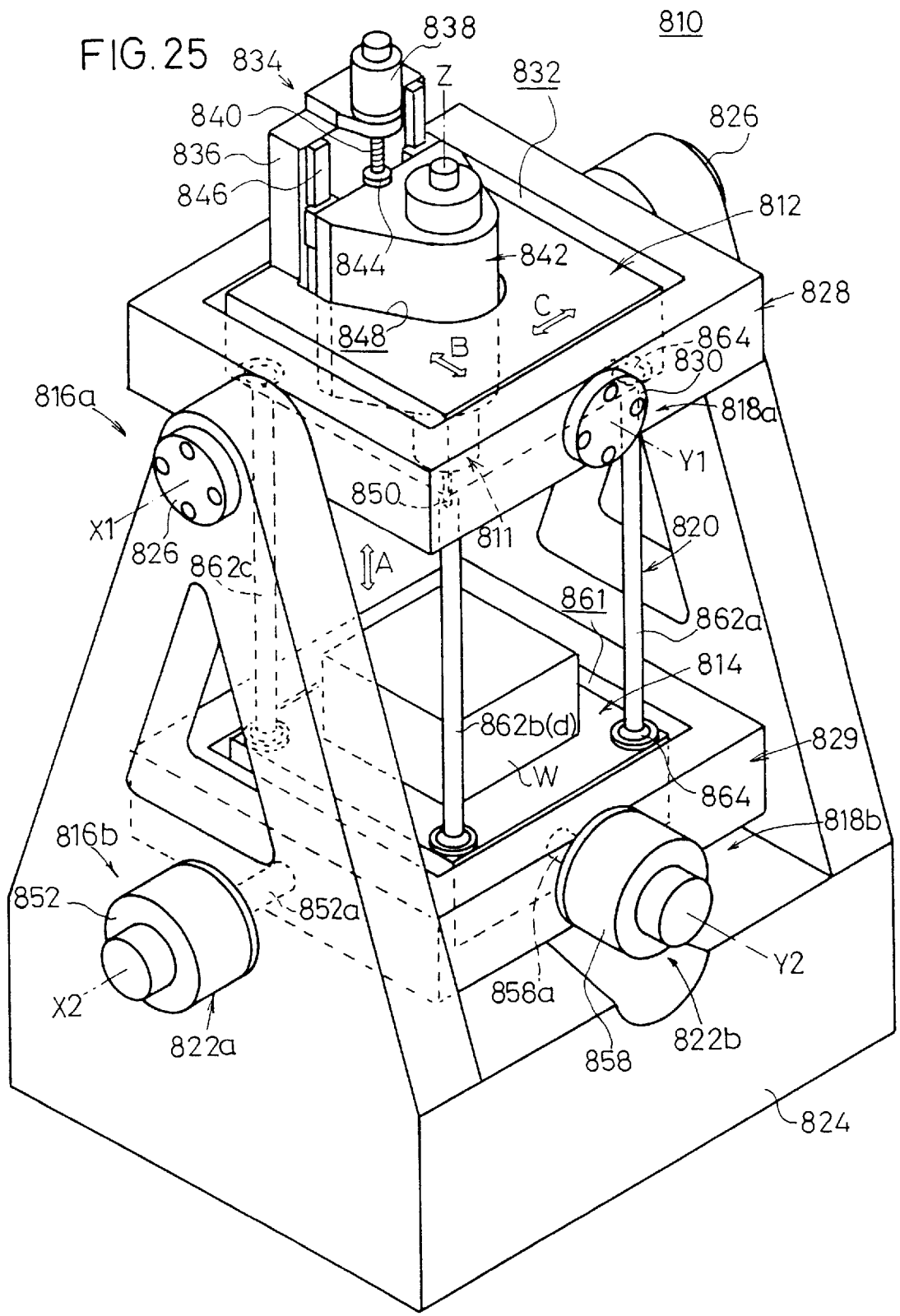
FIG. 25 is a perspective view of a machine tool which incorporates a relative positioning machine according to a ninth embodiment of the present invention.
Figure 26:
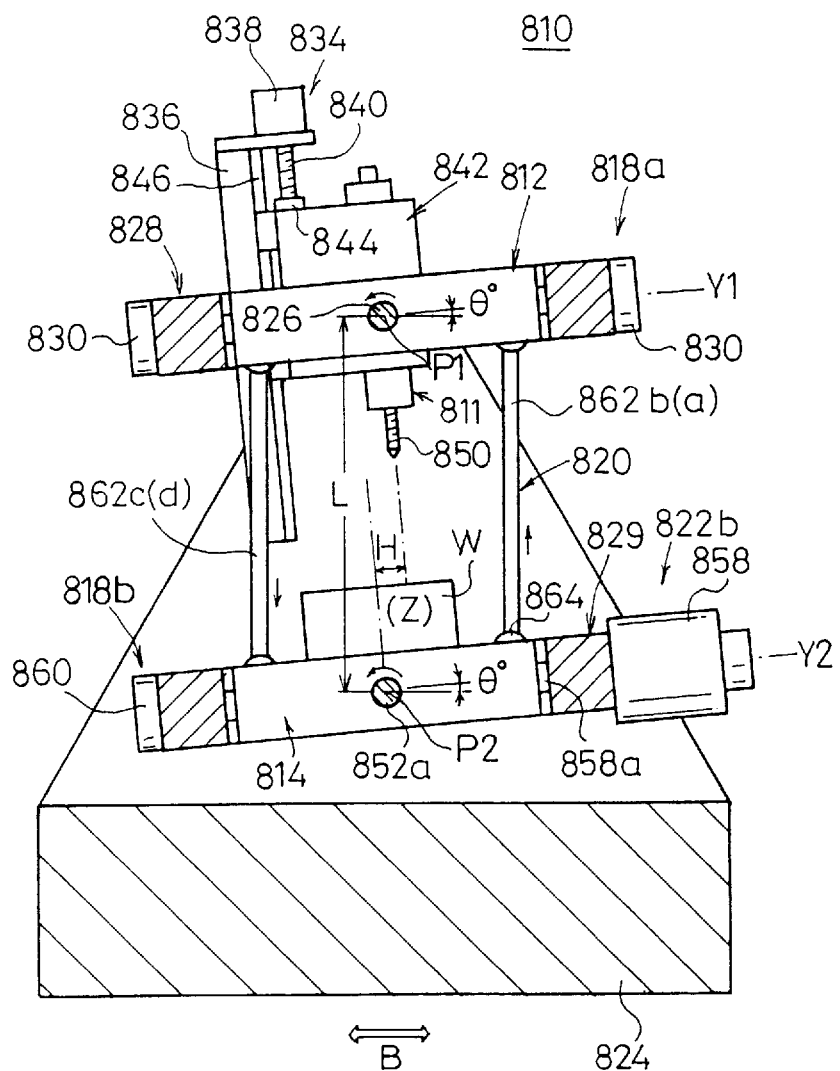
FIG. 26 is a cross-sectional view of the machine tool shown in FIG. 25, showing the position of the parts turned about X axes.
Figure 27:
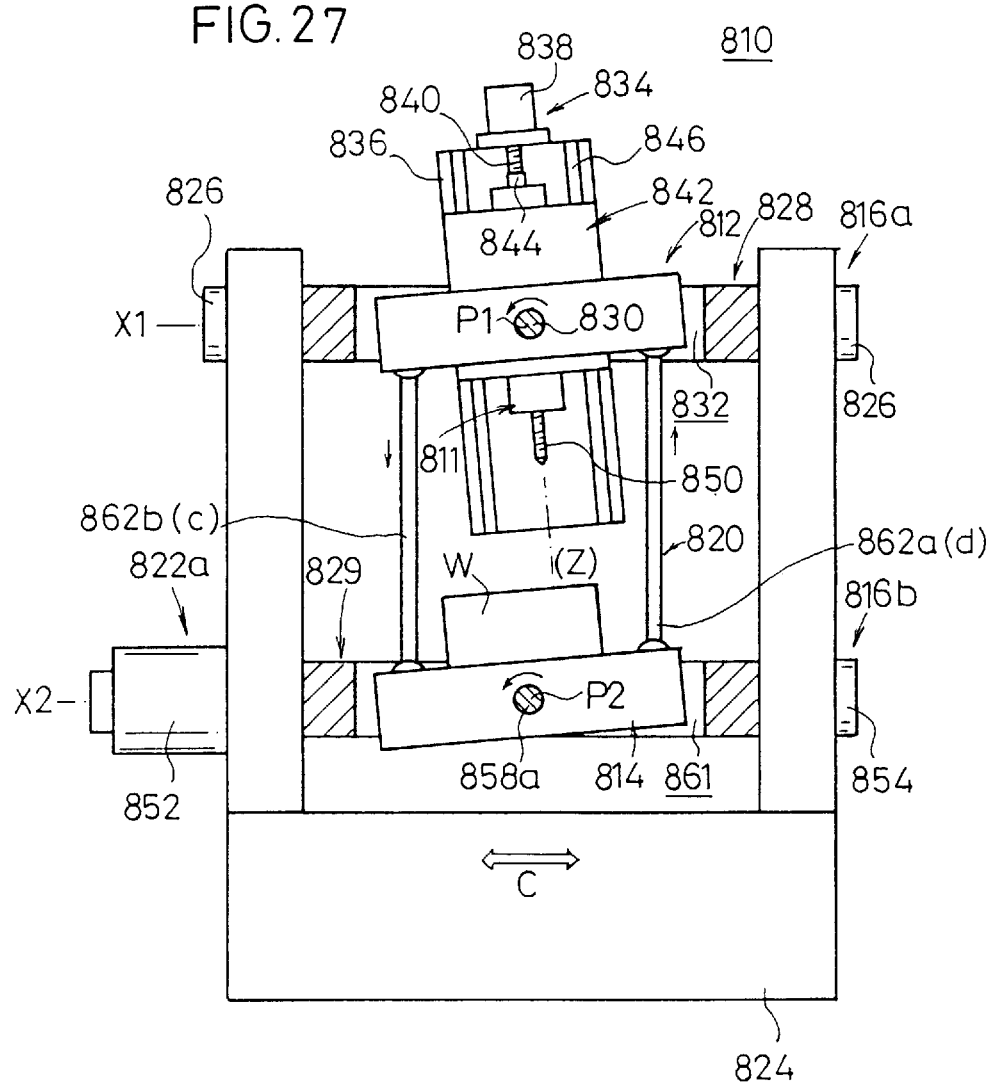
FIG. 27 is a cross-sectional view of the machine tool shown in FIG. 25, showing the position of the parts turned about Y axes.
Figure 28:
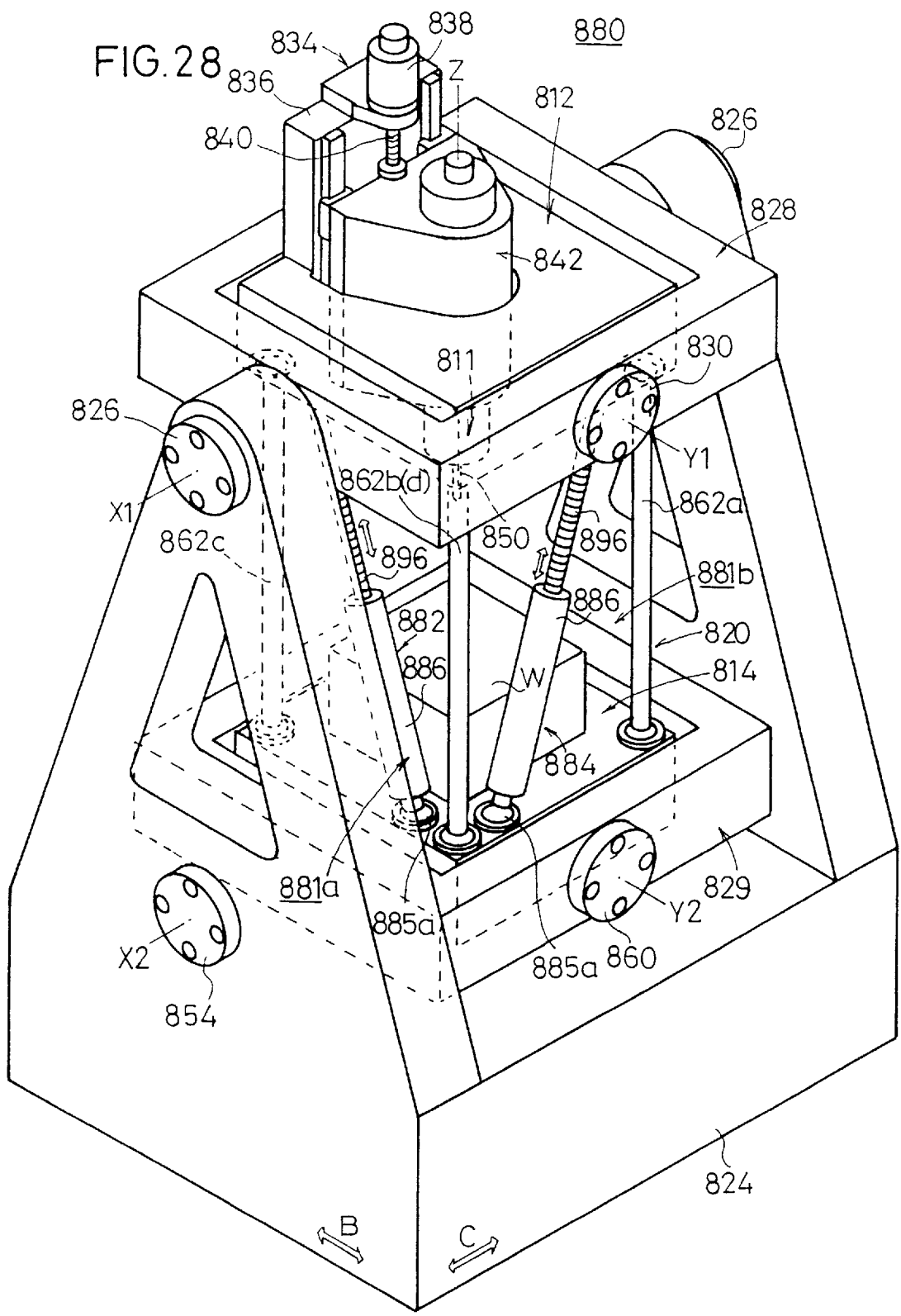
FIG. 28 is a perspective view of a machine tool which incorporates a relative positioning machine according to a tenth embodiment of the present invention.

FIGS. 25 through 27 show a machining tool 810 which incorporates a relative positioning machine according to a ninth embodiment of the present invention.

As shown in FIG. 25, the machining tool 810 has a spindle 811 whose axis extends generally along a Z axis and to which a machining tool is attached, a first panel (first member) 812 whose plane lies in the directions indicated by the arrows B, C and extends perpendicularly across the axis of the spindle 11, a second panel (second member) 814 to which a workpiece W is secured and which is spaced downwardly from the first panel 12, first through fourth support mechanisms 816*a*, 816*b*, 818*a*, 818*b* by which the first and second panels 812, 814 are tiltably supported for angular movement respectively about an X1 axis (first axis) and an X2 axis (second axis) which extend parallel to the directions indicated by the arrow C and also respectively about a Y1 axis (third axis) and a Y2 axis (fourth axis) which extend parallel to the directions indicated by the arrow B and perpendicularly to the X1 and X2 axes, a joint mechanism 820 by which the first and second panels 812, 814 are joined parallel to each other, and first and second actuator mechanisms 822*a*, 822*b* for tilting the first and second panels 812, 814 about the X1 axis, the X2 axis, the Y1 axis, and the Y2 axis while the first and second panels 812, 814 are being held parallel to each other by the joint mechanism 820.

As shown in FIGS. 25 through 27, the first and second support mechanisms 816*a*, 816*b* comprise a single common base 824, and the third and fourth support mechanisms 818*a*, 818*b* comprise respective first and second frames 828, 829 which are tiltably supported by the base 824 for angular movement about the X1 axis and the X2 axis, respectively, and by which the first and second panels 812, 814 are tiltably supported for angular movement about the Y1 axis and the Y2 axis, respectively.

The first support mechanism 816*a* comprises a pair of support shafts 826 supported on an upper portion of the base 824 and extending in the directions indicated by the arrow C. The first shafts 826 are coupled to opposite ends of the first frame 828 in the directions indicated by the arrow C. A pair of second shafts 830 is mounted on respective opposite ends of the first frame 828 in the directions indicated by the arrow C, and coupled to the first panel 812. The first panel 812 is tiltably disposed in a rectangular opening 838 defined in the first frame 828 for angular movement about the second shafts 830 in the rectangular opening 838.

The first panel 812 supports thereon a Z-axis actuator mechanism 834 for moving the spindle 811 along the Z axis across the first panel 812 toward and away from the second panel 814. The Z-axis actuator mechanism 834 comprises a vertically elongate base 836 fixedly mounted on the first panel 812 and extending in the directions indicated by the arrow A, and a Z-axis motor 838 mounted on an upper end of the base 836. The Z-axis motor 838 has a downwardly directed drive shaft (not shown) to which there is coaxially coupled a ball screw 840 that extends in the directions indicated by the arrow A and is threaded through a nut 844. The nut 844 is mounted on a block 842 slidably mounted on a pair of vertical guide rails 846 fixed to the base 836.

The first panel 812 has an opening 848 complementary in shape to the block 842, which is vertically movable through the opening 848 across the first panel 812. The spindle 811 is vertically supported by the block 842 for rotation with respect to the block 842 about the Z axis. A machining tool 850 such as a drill bit is mounted on the lower end of the spindle 811. The assembly including the block 842 and the Z-axis actuator mechanism 834 has its center of gravity positioned at a center of rotation of the first panel 812, i.e., a point (i.e., a point P1 shown in FIGS. 26 and 27) of intersection between the X1 and Y1 axes.

The first actuator mechanism 822a comprises an X-axis motor 852 fixed to a lower portion of the base 824 and having a drive shaft 832a coupled to an end of the second frame 829 in the directions indicated by the arrow B. A third shaft 854 is fixed to a lower portion of the base 824 in axially aligned, opposite relationship to the X-axis motor 852 and coupled to an opposite end of the second frame 829 in the directions indicated by the arrow B. The second actuator mechanism 822b comprises a Y-axis motor 858 fixed to an end of the second frame 829 in the directions indicated by the arrow B and a fourth shaft 860 mounted on the second frame 829 in axially aligned, opposite relationship to the Y-axis motor 858. The Y-axis motor 858 has a drive shaft coupled to the second panel 814 and the fourth shaft 860 is coupled to the second panel 814 in axially aligned, opposite relationship to the drive shaft 858a. The second panel 814 is tiltable about the X2 axis by the X-axis motor 852, and about the Y2 axis by the Y-axis motor 858.

The second panel 814 is tiltably disposed in a rectangular opening 861 defined in the second frame 829 for angular movement about the Y2 axis in the rectangular opening 861. The second panel 814 supports thereon the workpiece W such that the center of gravity of the workpiece W is positioned at a center of rotation of the second panel 14, i.e., a point (i.e., a point P2 shown in FIGS. 26 and 27) of intersection between the X2 and Y2 axes.

The joint mechanism 820 comprises four parallel rods 862a, 862b, 862c, 862d by which the first and second panels 812, 814 are interconnected and kept parallel to each other. The rods 862a, 862b, 862c, 862d are positioned respectively at the four corners of the first and second panels 812, 814 and angularly movably connected thereto by universal joints 864.

The machine tool 810 operates as follows:

As shown in FIG. 25, the first and second panels 812, 814 are held horizontally, and the spindle 811 is rotated in one direction to rotate the drill bit 850 while at the same time the Z-axis actuator mechanism 834 is operated. The ball screw 840 is rotated about its own axis by the Z-axis motor 838, causing the nut 844 to move the block 842 and hence the spindle 811 downwardly along the guide rails 846. The rotating drill bit 850 now drills a hole at a predetermined position in the workpiece W mounted on the second panel 814.

After the hole has been drilled at the predetermined position in the workpiece W by the drill bit 850, the Z-axis motor 838 is reversed to cause the block 842 to move the spindle 811 upwardly away from the workpiece W, and then the relative position of the drill bit 850 with respect to the workpiece W is changed.

Specifically, if the workpiece W is to be drilled at a next position which is spaced away from the already drilled position parallel to the directions indicated by the arrow B, then the X-axis motor 852 of the first actuator mechanism 822a is energized to cause the drive shaft 852a to tilt the second frame 829 through an angle θ° about the X2 axis, as shown in FIG. 26. The second panel 814 which is supported on the second frame 829 by the Y-axis motor 858 and the fourth shaft 860 is also tilted in union with the second frame 829 through the angle θ° about the X2 axis.

The first panel 812 which is connected to the second panel 814 by the four rods 862a~862d is also tilted in union with the first frame 828 through the angle θ° about the first shafts 826.

As shown in FIG. 26, if the distance between the axis (the point P1) of the first shafts 826 and the axis (the point P2) of the X-axis motor 852 is represented by L, then a distance H by which the next position where the workpiece W is to be drilled by the drill bit 850 is spaced from the previously drilled position is expressed by H=L·sinθ. Therefore, distances between various positions to be drilled on the workpiece W can be determined when the distance L is preset and various angles θ° are selected for tilting the second panel 829 with the X-axis motor 852.

If the workpiece W is to be drilled at a next position which is spaced away from the already drilled position parallel to the directions indicated by the arrow C, then the Y-axis motor 858 is energized to tilt the second panel 814 through a given angle about the Y2 axis with respect to the second frame 829, as shown in FIG. 27. Therefore, the first panel 812 which is connected to the second panel 814 by the four rods 862a~862d is also tilted about the second shafts 830 with respect to the first frame 828. Consequently, the first and second panels 812, 814 are tilted the given angle from the horizontal direction about the Y1 and Y2 axes while being kept parallel to each other, orienting the drill bit 850 to the next position that is spaced away from the already drilled position parallel to the directions indicated by the arrow C.

In the ninth embodiment, as described above, the block 842 with the spindle 811 is vertically movably supported on the first panel 812, and the center of gravity of the assembly including the block 842 and the Z-axis actuator mechanism 834 is positioned at the center of rotation of the first panel 12, i.e., the point P1, and the center of gravity of the workpiece W is positioned at the center of rotation of the second panel 14, i.e. the point P2.

For moving from one position to another where the workpiece W is to be drilled by the drill bit 850, the X-axis motor 852 and the Y-axis motor 858 of the first and second actuator mechanisms 822a, 822b are selectively energized to tilt the first and second panels 812, 814 about the X1 and X2 axes and the Y1 and Y2 axes while the first and second panels 812, 814 are being kept parallel to each other. Consequently, any inertia developed when the first and second panels 812, 814 are angularly moved two-dimensionally and three-dimensionally is minimized.

As a result, because the block 842 is not horizontally moved in the directions indicated by the arrows B, C unlike the conventional positioning structure, no substantial inertia is developed by the moving parts, but the drill bit 850 and the workpiece W can reliably and smoothly be positioned relatively to each other with very small forces. The X-axis motor 852 and the Y-axis motor 858 of the first and second actuator mechanisms 822a, 822b may be highly small in size, and the drill bit 852 and the workpiece W can quickly be positioned relatively to each other. Therefore, the drill bit 852 can efficiently and quickly machine a plurality of areas on the workpiece W.

The first and second panels 812, 814 are interconnected by the joint mechanism 820 which has the four rods 862a~862d, and the first and second actuator mechanisms 822a, 822b including the X-axis motor 852 and the Y-axis motor 858 are associated with only the second panel 814. Consequently, the machine tool 810 may be effectively simplified and reduced in size in its entirety.

While in the ninth embodiment the first and second panels 812, 814 are tiltable about the X1, X2 axes and the Y1, Y2 axes, the first and second panels 812, 814 may be tiltable only about the X1, X2 axes, respectively.

A machine tool 880 which incorporates a relative positioning machine according to a tenth embodiment of the present invention will be described below with reference to FIGS. 28 through 31. Those parts of the machine tool 880 which are identical to those of the machine tool 810 according to the ninth embodiment are denoted by identical reference characters, and will not be described in detail below.

The machine tool 880 has first and second actuator mechanisms 881a, 881b which are different from those of the machine tool 810 according to the ninth embodiment. Specifically, the first actuator mechanism 881a comprises a first extendible/contractable assembly 882 for tilting the first and second panels 812, 814 in unison with each other about the X1 and X2 axes, respectively, and the second actuator mechanism 881b comprises a second extendible/contractable assembly 884 for tilting the first and second panels 812, 814 in unison with each other about the Y1 and Y2 axes, respectively.

Figure 29:
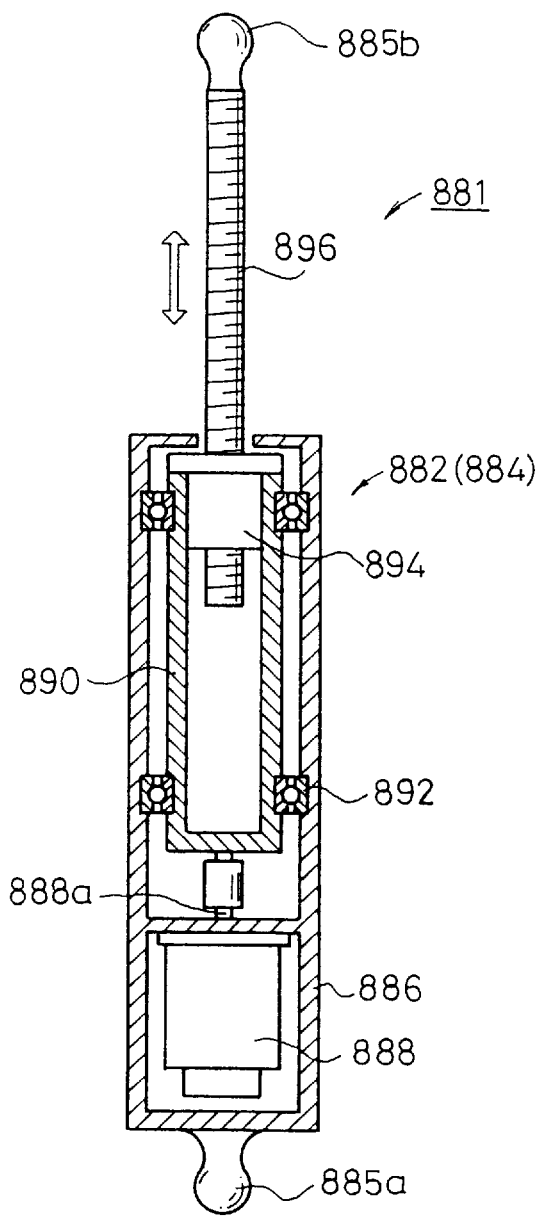
FIG. 29 is a cross-sectional view of each of first and second actuator mechanisms of the machine tool shown in FIG. 28.

The first extendible/contractable assembly 882 comprises a casing 886 coupled to the second panel 814 by a universal joint 885a near the rod 862b, and a motor 888 (see FIG. 29) housed in the casing 886. As shown in FIG. 29, the motor 888 has a drive shaft 888a coupled coaxially to a rotary tube 890 which is rotatably supported in the casing 886 by bearings 892. A nut 894 is fixedly mounted in the rotary tube 890 and threaded over a ball screw 896 which has an outer end connected to the first panel 812 by a universal joint 885b near the rod 862c (see also FIGS. 28 and 30).

The second extendible/contractable assembly 884 is identical in structure to the first extendible/contractable assembly 882. Therefore, those parts of the second extendible/contractable assembly 884 which are identical to those of the first extendible/contractable assembly 882 are denoted by identical reference characters, and will not be described in detail below. The casing 886 of the second extendible/contractable assembly 884 engages the second panel 814 near the rod 862b, and the ball screw 896 thereof engages the first panel 812 near the rod 862a (see FIGS. 28 and 31).

In operation, when the first extendible/contractable assembly 882 of the first actuator mechanism 881a is operated, the drive shaft 888 and the rotary tube 890 are rotated in unison with each other by the motor 888. Therefore, the nut 894 fixedly mounted in the rotary tube 890 is rotated, causing the ball screw 896 threaded in the nut 894 to move back and forth axially with respect to the nut 894.

Figure 30:
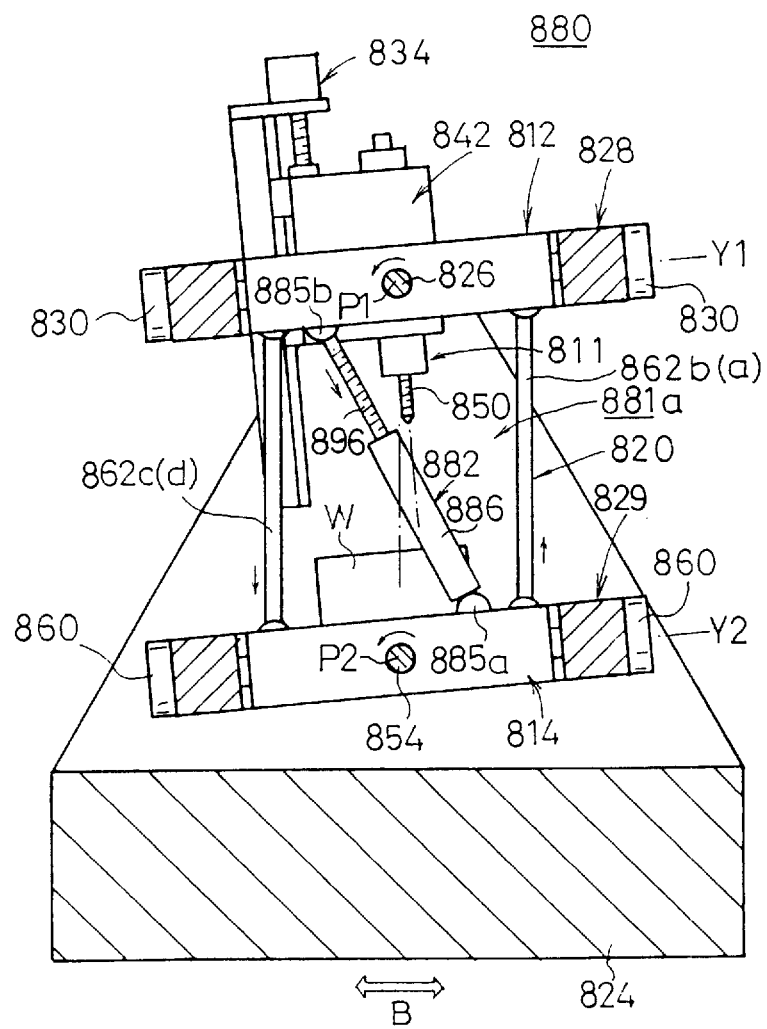
FIG. 30 is a cross-sectional view of the machine tool shown in FIG. 28, showing the position of the parts turned about X axes.
Figure 31:
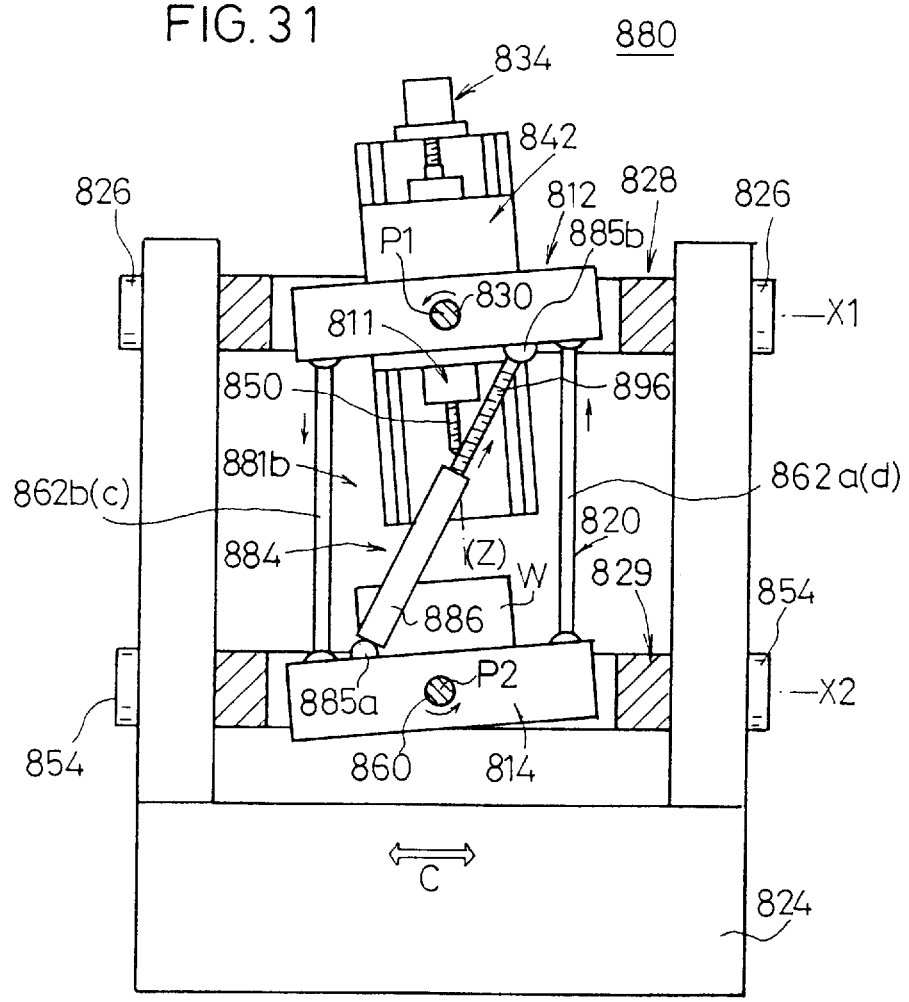
FIG. 31 is a cross-sectional view of the machine tool shown in FIG. 28, showing the position of the parts turned about Y axes.

When the ball screw 896 moves axially into the casing 886, for example, as shown in FIG. 30, the first and second panels 812, 814 are subjected to tensile forces about the X1 and X2 axes. Therefore, the first and second panels 812, 814 are tilted respectively about the X1 and X2 axes while being kept parallel to each other by the parallel link structure which is composed of the four rods 862a~862d. As a result, the drill bit 850 is oriented to a new position on the workpiece W in one of the directions indicated by the arrow C.

Since the machine tool 880 according to the tenth embodiment has the first and second extendible/contractable assemblies 882, 884, the machine tool 880 may be relatively small in its entirety, and offers the same advantages as the machine tool 810 according to the ninth embodiment.

A machine tool 900 which incorporates a relative positioning machine according to an eleventh embodiment of the present invention will be described below with reference to FIGS. 32 and 33. Those parts of the machine tool 900 which are identical to those of the machine tool 810 according to the ninth embodiment are denoted by identical reference characters, and will not be described in detail below.

Figure 32:
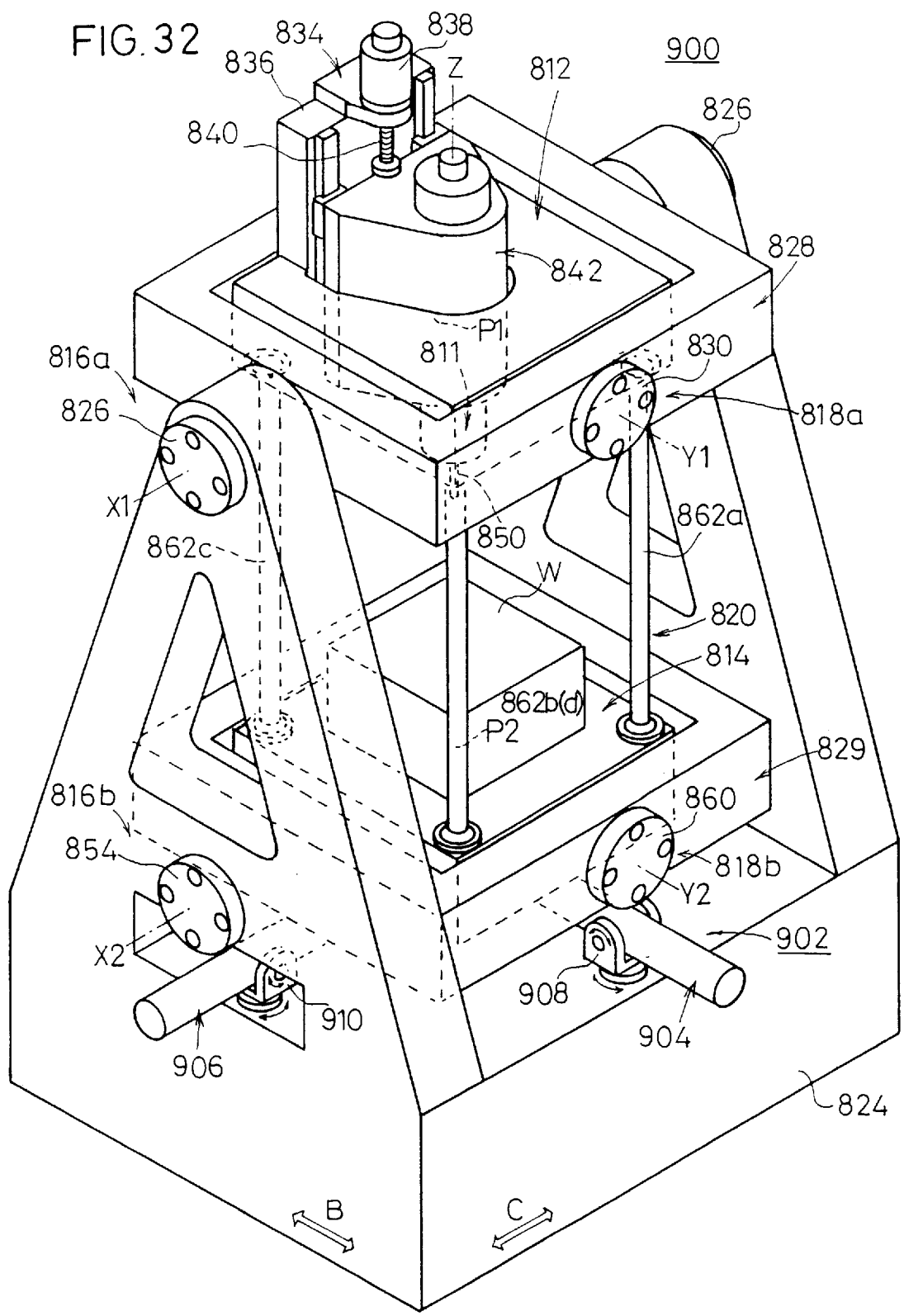
FIG. 32 is a perspective view of a machine tool which incorporates a relative positioning machine according to an eleventh embodiment of the present invention.
Figure 33:
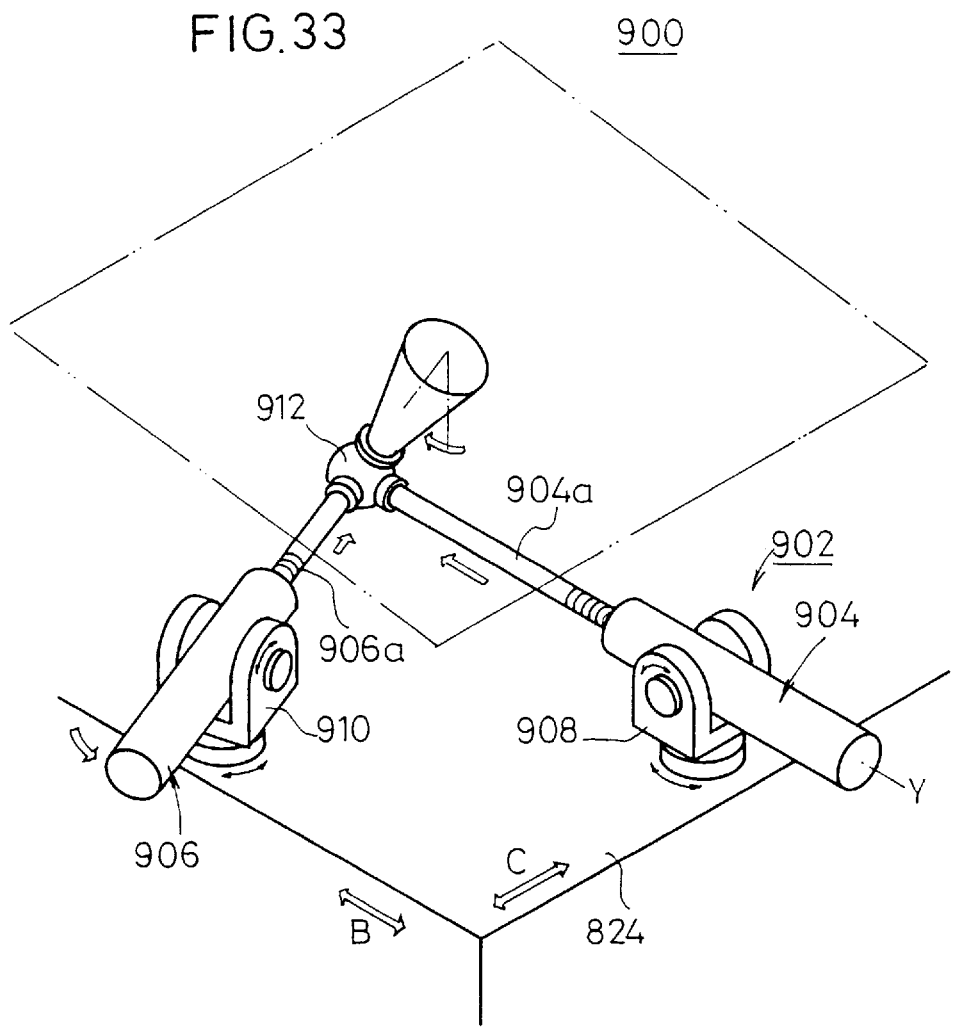
FIG. 33 is a perspective view of each of first and second actuator mechanisms of the machine tool shown in FIG. 32.

As shown in FIGS. 32 and 33, the machine tool 900 has an actuator mechanism 902 in place of the first and second actuator mechanisms 822a, 822b according to the ninth embodiment. The actuator mechanism 902 comprises a first ball screw assembly (first actuator) 904 and a second ball screw assembly (second actuator) 105 which are swingably supported on the base 824 by attachments 908, 910 for swinging movement in horizontal and vertical directions. The first and second ball screw assemblies 904, 906 are identical in structure to the first and second extendible/contractable assemblies 882, 884 according to the tenth embodiment, and will not be described in detail below.

The first and second ball screw assemblies 904, 906 have ball screws (rods) 904a, 906a coupled to a ball joint 912 which is positioned on a straight line interconnecting a point (point P1) of intersection between the X1 and Y1 axes and a point (point P2) of intersection between the X2 and Y2 axes and projects downwardly from a lower surface of the second panel 814.

When the second panel 814 is kept in a horizontal attitude, the first ball screw assembly 904 extends in the directions indicated by the arrows B, and the second ball screw assembly 906 extends in the directions indicated by the arrows C, and the ball screws 904a, 906a thereof are coupled to the ball joint 912 perpendicularly to each other.

In operation, the first ball screw assembly 904 is actuated to displace the ball screw 904a thereof in the direction indicated by the arrow in FIG. 33. Then, the ball joint 912 coupled to the ball screw 904a tilts the second panel 814 about the X2 axis. As the ball joint 912 moves with the ball screw 904a, the second ball screw assembly 906 is turned in the direction indicated by the arrow with its ball screw 906a extending out in the direction indicated by the arrow. The second panel 814 is now tilted about the X2 axis at the third shafts 854 of the second support mechanism 816b. The first panel 812 which is coupled to the second panel 814 by the rods 862a~862d is tilted about the X1 axis at the first shafts 826 of the first support mechanism 816a. Therefore, the drill bit 850 is oriented to a new position on the workpiece W in one of the directions indicated by the arrow B.

When the first and second ball screw assemblies 904, 906 are operated, the ball joint 912 is pushed in various directions for thereby positionally adjusting three-dimensionally the second panel 814 connected to the ball joint 912. The drill bit 850 can quickly and easily be positioned relatively to any of various areas on the workpiece W for drilling those areas.

FIG. 34 shows a machine tool 1000 which incorporates a relative positioning machine according to a twelfth embodiment of the present invention. As shown in FIG. 34, the machine tool 1000 comprises a first attachment (first member) 1004 supporting a spindle 1002, a second attachment (second member) 1006 supporting a workpiece W, first and second support mechanisms 1008, 1010 by which the first and second attachments 1004, 1006 are rotatably supported for angular movement respectively about a Z1 axis (first axis) and a Z2 axis (second axis) which are parallel to each other, a joint mechanism 1012 by which the first and second attachments 1004, 1006 are coupled to each other parallel to each other, and an actuator mechanism 1014 for rotating the first and second attachments 1004, 1006 about respective Z1, Z2 axes parallel to each other through the joint mechanism 1012.

The first and second support mechanisms 1008, 1010 have a common base 1020 on which the first and second attachments 1004, 1006 are rotatably supported for rotation about the respective Z1, Z2 axes by respective first and second rotary bases 1016, 1018. The first and second rotary bases 1016, 1018 have an X1-axis actuator mechanism 1022 and an X2-axis actuator mechanism 1024, respectively, for individually tilting the first and second attachments 1004, 1006 about an X1 axis (third axis) and an X2 axis (fourth axis), respectively, which extend across the Z1 axis and the Z2 axis, respectively.

The X1-axis actuator mechanism 1022 and the X2-axis actuator mechanism 1024 have an X1-axis motor 1026 and an X2-axis motor 1028, respectively, which are fixed to respective ends of the first and second attachments 1004, 1006, and a first shaft 1030 and a second shaft 1032, respectively, which are coupled to respective opposite ends of the first and second attachments 1004, 1006.

The joint mechanism 1012 comprises first and second pulleys 1034, 1036 mounted respectively on the first and second rotary bases 1016, 1018, and a belt 1038 trained around the first and second pulleys 1034, 1036. The actuator mechanism 1014 comprises a motor 1040 coupled to the first pulley 1034 for rotating the same.

A holder 1042 is mounted in the first attachment 1004 and supports thereon a Y-axis actuator mechanism 1044 for moving the spindle 1002 toward and away from the workpiece W. The Y-axis actuator mechanism 1044 comprises a motor 1046 fixedly mounted on a rear end of the holder 1042. The holder 1042 holds the spindle 1002 on an end thereof remote from the motor 1046. The motor 1046 has a drive shaft coupled coaxially to a ball screw (not shown) operatively connected to the spindle 1002. Therefore, when the motor 1046 is energized, the spindle 1002 can be moved toward and away from the workpiece W through the ball screw.

Operation of the machine tool 1000 according to the twelfth embodiment will be described below.

A machining tool 1048 such a drill bit is attached to the spindle 1002, and the workpiece W is attached to the second attachment 1006. While the spindle 1002 is being rotated to rotate the drill bit 1048, the spindle 1002 is moved in one of the directions indicated by the arrow A toward the workpiece W by the Y-axis actuator mechanism 1044 for thereby drilling a hole in the workpiece W.

For moving the drilled position to another position to be drilled on the workpiece W in the directions indicated by the arrow B, the motor 1040 is energized to rotate the rotary base 1016 in unison with the first pulley 1034 about the Z1 axis. At this time, the second rotary base 1018 is also rotated about the Z2 axis by the belt 1038 which is trained around the first and second pulleys 1034, 1036.

Therefore, the first and second attachments 1004, 1006 are turned through the same angle in the same direction by the joint mechanism 1012, directing the drill bit 1048 in the directions indicated by the arrows B to point at another position to be drilled on the workpiece W while being held perpendicularly to the workpiece W.

The first and second attachments 1004, 1006 are individually tiltable about the respective X1 and X2 axes by the X1-axis actuator mechanism 1022 and the X2-axis actuator mechanism 1024, respectively. Consequently, the angle of the drill bit 1048 directed to the workpiece W can be adjusted to drill the workpiece W in various positions at various angles. The machine tool 1000 is thus highly versatile in its machining operation.

Figure 35:
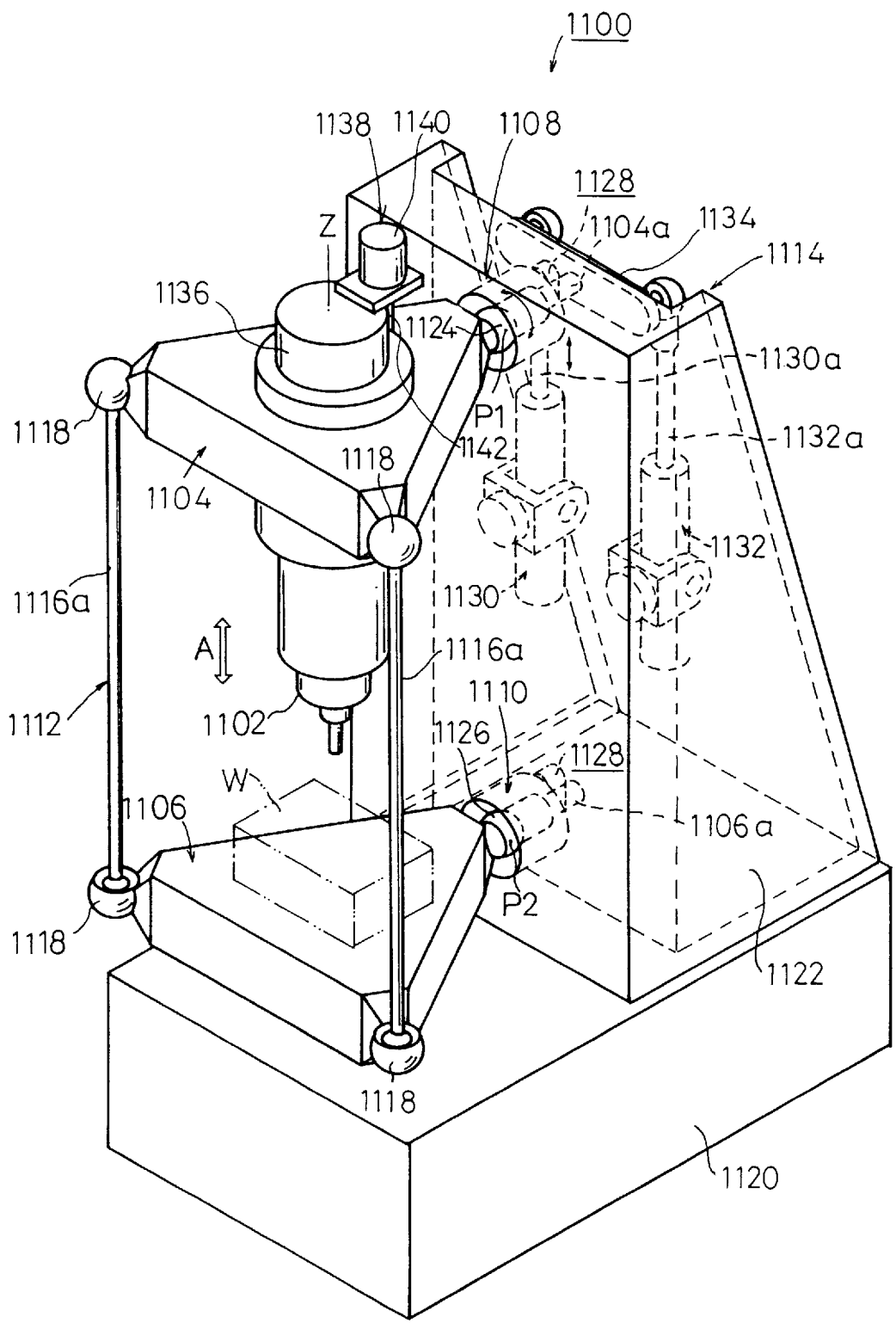
FIG. 35 is a perspective view of a machine tool which incorporates a relative positioning machine according to a thirteenth embodiment of the present invention.

FIG. 35 shows a machine tool 1100 which incorporates a relative positioning machine according to a thirteenth embodiment of the present invention. As shown in FIG. 35, the machine tool 1100 comprises a first panel (first member) 1104 supporting a spindle 1102, a second panel (second member) 1106 supporting a workpiece W, first and second support mechanisms 1108, 1110 by which the first and second panels 1104, 1106 are tiltably supported for angular movement respectively about various axes which extend across a straight line interconnecting two points P1, P2 and pass through the two points P1, P2, a joint mechanism 1112 by which the first and second panels 1104, 1106 are coupled to each other parallel to each other, and an actuator mechanism 1114 for rotating the first and second panels 1104, 1106 about various axes parallel to each other through the joint mechanism 1112.

The first and second panels 1104, 1106 are coupled by joints 1118 to two parallel rods 1116a, 1116b of the joint mechanism 1112. The first and second panels 1104, 1106 have first and second rods 1104a, 1106a attached to respective ends thereof.

The first and second support mechanisms 1108, 1110 have a common base 1120 including a vertical side wall 1122. The side wall 1122 has first and second spherical bearings 1124, 1126 which form respective spherical pairs with the first and second rods 1104a, 1106a. The side wall 1122 also has two vertically spaced oblong openings 1128 defined therein. The first and second rods 1104a, 1106a extend respectively through the oblong openings 1128 and are swingable therein vertically in the directions indicated by the arrow A.

The actuator mechanism 1114 has first and second ball screw assemblies 1130, 1132 which are swingably mounted on the side wall 1122 parallel to each other. The first and second ball screw assemblies 1130, 1132 are identical in structure to the first and second extendible/contractable assemblies 882, 884 according to the tenth embodiment, and will not be described in detail below.

The first and second ball screw assemblies 1130, 1132 have respective ball screws 1130a, 1132a extending upwardly and coupled to respective opposite ends of a swing bar 1134 which is fixed at an intermediate portion to a distal end of the rod 1104a.

The spindle 1102 is supported on a lower end of a holder 1136 which is mounted on the first panel 1104. The holder 1136 supports a Z-axis actuator mechanism 1138 for moving the spindle 1102 along a Z axis across the first panel 1104 toward and away from the second panel 1106. The Z-axis actuator mechanism 1138 comprises a motor 1140 fixedly mounted on a rear end of the holder 1136 and having a drive shaft coupled coaxially to a ball screw 1142 which is operatively connected to the spindle 1102. Therefore, when the motor 1140 is energized, the spindle 1102 can be moved in the directions indicated by the arrow A by the ball screw 1142.

In operation, when the first and second ball screw assemblies 1130, 1132 are actuated to move the respective ball screws 1130a, 1132a axially the same distance in the same direction, the swing bar 1134 connected to the ball screws 1130a, 1132a now moves vertically in the directions indicated by the arrow A. The first rod 1104a fixed to the swing bar 1134 is tilted also in the directions indicated by the arrow A, vertically tilting the first and second panels 1104, 1106 parallel to each other through the rods 1116a, 1116b.

When the first and second ball screw assemblies 1130, 1132 are actuated to move the respective ball screws 1130a, 1132a axially a desired distance in opposite directions, the swing bar 1134 connected to the ball screws 1130a, 1132a is swung about its own axis. Therefore, the first rod 1104a fixed to the swing bar 1134 is angularly movable about its own axis, turning the first and second panels 1104, 1106 about the respective rods 1104*a*, 1106*a* parallel to each other through the rods 1116*a*, 1116*b*.

Therefore, when the actuator mechanism 1114 is operated, the first and second panels 1104, 1106 can be tilted or turned while being kept parallel to each other, for thereby quickly and easily positioning the spindle 1102, i.e., a machining tool such as a drill bit mounted thereon, and the workpiece W relatively to each other.

In each of the ninth through thirteenth embodiments, the drill bit is used as the machining tool to machine the workpiece W. However, any of various other machining tools may be used to machine the workpiece W.

Figure 36:
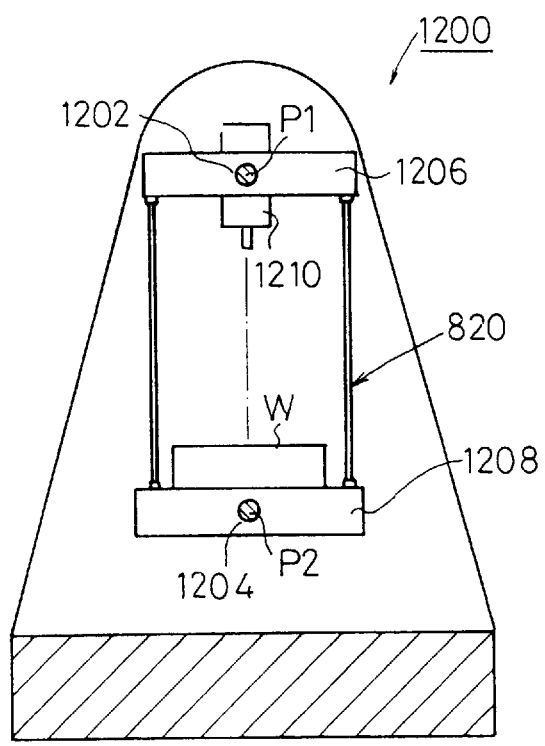
FIG. 36 is a perspective view of a machine tool which incorporates a relative positioning machine according to a fourteenth embodiment of the present invention.
Figure 37:
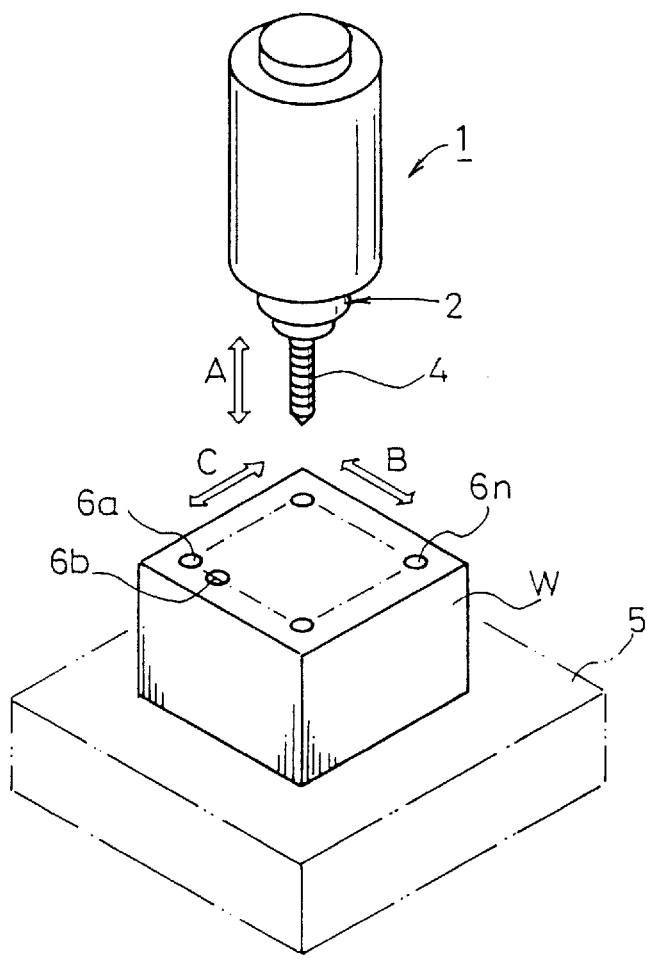
FIG. 37 is a perspective view of a conventional machine tool.

For example, FIG. 36 shows a laser beam machining apparatus 1200 which incorporates a relative positioning machine according to an eighth embodiment of the present invention. The laser beam machining apparatus 1200 comprises first and second panels 1206, 1208 angularly movable about respective shafts 1202, 1204 that extend across a straight line N interconnecting points P1, P2 and also extend respectively through the points P1, P2. Although not shown specifically, the first and second shafts 1202, 1204 can be rotated by respective mechanisms which are identical to the first actuator mechanism 822*a* of the machine tool 810 according to the ninth embodiment of the present invention.

A laser beam machining head 1210 is fixed to the first panel 1206, and a workpiece W is mounted on the second panel 1208. The first and second panels 1206, 1208 are kept parallel to each other by a joint mechanism 820 which operatively interconnect the first and second panels 1206, 1208.

When the first and second panels 1206, 1208 are tilted the same angle in the same direction, the laser beam machining head 1210 directed to any of various machining areas on the workpiece W at any of various angles with respect thereto. Accordingly, the laser beam machining head 1210 can quickly and easily machine the workpiece W.

The laser beam machining apparatus 1200 may be of the same structure as any of the machine tools 810, 880, 900, 1000, 1100 described above. Furthermore, the principles of the present invention shown in FIG. 36 are also applicable to a water jet machining apparatus having a water jet machining head.

Although certain preferred embodiments of the present invention has been shown and described in detail, it should be understood that various changes and modifications may be made therein without departing from the scope of the appended claims.

What is claimed is:

1. A relative positioning machine comprising:
   a first member for supporting a machining tool either directly or indirectly thereon; and
   a second member for supporting a workpiece either directly or indirectly thereon;
   said first member and said second member being individually swingable about axes which extend across a straight line interconnecting two points and which extend respectively through said points.

2. A relative positioning machine according to claim 1, wherein one of said points is positioned near a center of gravity of said first member with the machining tool supported thereon, and the other of said points is positioned near a center of gravity of said second member with the workpiece supported thereon.

3. A relative positioning machine according to claim 1, further comprising:
   first and second support mechanisms by which the first and second members are swingably supported for angular movement about respective first and second axes which extend parallel to each other; and
   first and second actuator mechanisms for individually angularly moving said first and second members about said first and second axes, respectively.

4. A relative positioning machine according to claim 1, further comprising:
   first and second support mechanisms by which the first and second members are swingably supported for angular movement about respective first and second axes which extend parallel to each other;
   third and fourth support mechanisms by which the first and second members are swingably supported for angular movement about respective third and fourth axes which extend across said first and second axes, respectively;
   first and second actuator mechanisms for individually angularly moving said first and second members about said first and second axes, respectively; and
   third and fourth actuator mechanisms for individually angularly moving said first and second members about said third and fourth axes, respectively.

5. A relative positioning machine according to claim 4, wherein said first and second support mechanisms have a base on which said first and second members are tiltably supported for angular movement about said first and second axes, respectively, and wherein said third and fourth support mechanisms have respective first and second frames which are supported on said base and by which said first and second members are tiltably supported for angular movement about said third and fourth axes, respectively.

6. A relative positioning machine according to claim 5, wherein said first and second actuator mechanisms comprise respective motors fixedly mounted on said base and having respective drive shafts extending along said first and second axes, respectively, and coupled to said first and second frames, respectively, and wherein said third and fourth actuator mechanisms comprise respective motors fixedly mounted on said first and second frames, respectively, and having respective drive shafts extending along said third and fourth axes, respectively, and coupled to said first and second members, respectively.

7. A relative positioning machine according to claim 4, wherein said first and second support mechanisms have a base on which said first and second members are individually rotatably supported for angular movement about said first and second axes, respectively, and wherein said third and fourth actuator mechanisms comprise first and second rotary bases, respectively, which are supported on said base and by which said first and second members are individually tiltably supported for angular movement about said third and fourth axes, respectively.

8. A relative positioning machine according to claim 1, further comprising:
   first, second, third, and fourth support mechanisms by which said first and second members are tiltably supported for angular movement about two axes extending across each other; and
   first and second actuator mechanisms for individually tilting said first and second members about said two axes.

9. A relative positioning machine according to claim 8, wherein said first actuator mechanism comprises first and second ball screw assemblies extending across each other and connected to said first member, and said second actuator mechanism comprises third and fourth ball screw assemblies extending across each other and connected to said second member.

10. A relative positioning machine according to claim 1, further comprising:
   first and second support mechanisms by which the first and second members are tiltably supported for angular movement about a plurality of axes; and
   first and second actuator mechanisms for individually tilting said first and second members about said plurality of axes.

11. A relative positioning machine according to claim 10, wherein said first and second members and said first and second support mechanisms jointly make up respective spherical pairs.

12. A relative positioning machine according to claim 10, wherein said first actuator mechanism comprises first and second ball screw assemblies extending across each other and connected to said first member, and said second actuator mechanism comprises third and fourth ball screw assemblies extending across each other and connected to said second member.

13. A relative positioning machine according to claim 1, further comprising:
   a first support mechanism by which said first member is tiltably supported for angular movement about a plurality of axes;
   second and third support mechanisms by which said second member is swingably supported for angular movement about first and second axes which extend across each other;
   a first actuator mechanism for tilting said first member about said plurality of axes; and
   second and third actuator mechanisms for individually swinging said second member about said first and second axes.

14. A relative positioning machine according to claim 13, wherein said first member and said first support mechanism jointly make up a spherical pair.

15. A relative positioning machine according to claim 13, wherein said first actuator mechanism comprises first and second ball screw assemblies extending across each other and connected to said first member.

16. A relative positioning machine according to claim 1, further comprising:
   a first support mechanism by which said first member is tiltably supported for angular movement about a first axis;
   a second support mechanism by which said second member is tiltably supported for angular movement about a second axis;
   first and second actuator mechanisms for individually tilting said first and second members about said first and second axes, respectively; and
   actuating means for moving said second support mechanism along an axis parallel to said second axis.

17. A relative positioning machine according to claim 1, further comprising:
   a first support mechanism by which said first member is tiltably supported for angular movement about a first axis;
   a second support mechanism by which said second member is tiltably supported for angular movement about a second axis;
   first and second actuator mechanisms for individually tilting said first and second members about said first and second axes, respectively; and
   a turntable mounted on said second member for supporting the workpiece.

18. A relative positioning machine according to claim 1, further comprising a spindle supporting said machining tool, said spindle being axially movably mounted on said first member, said workpiece being mounted on said second member.

19. A relative positioning machine according to claim 1, further comprising a laser beam machining head as said machining tool, said laser beam machining head being mounted on said first member, said workpiece being mounted on said second member.

20. A relative positioning machine comprising:
   a first member for supporting a machining tool either directly or indirectly thereon;
   a second member for supporting a workpiece either directly or indirectly thereon;
   said first member and said second member being swingable about axes which extend across a straight line interconnecting two points and which extend respectively through said points; and
   a joint mechanism interconnecting said first and second members parallel to each other.

21. A relative positioning machine according to claim 20, wherein one of said points is positioned near a center of gravity of said first member with the machining tool supported thereon, and the other of said points is positioned near a center of gravity of said second member with the workpiece supported thereon.

22. A relative positioning machine according to claim 20, wherein said joint mechanism comprises a plurality of rods having opposite ends engaging said first and second members, for tilting said first and second members in ganged relation while keeping the first and second members parallel to each other.

23. A relative positioning machine according to claim 20, further comprising:
   first and second support mechanisms by which said first and second members are swingably supported for angular movement respectively about first and second axes which extend parallel to each other; and
   an actuator mechanism for turning said first and second members in unison with each other about said first and second axes while maintaining the first and second members parallel to each other through said joint mechanism.

24. A relative positioning machine according to claim 23, wherein said first and second support mechanisms have a base and first and second rotary bases rotatably mounted on said base, said first and second members being rotatably mounted on said first and second rotary bases, respectively, for angular movement about said first and second axes, and wherein said joint mechanism comprises:
   first and second pulleys mounted on said first and second rotary bases, respectively; and
   a belt trained around said first and second pulleys.

25. A relative positioning machine according to claim 24, wherein said first and second rotary bases have respective first and second actuator mechanisms for individually tilting said first and second members about third and fourth axes, respectively, which extend across said first and second axes, respectively.

26. A relative positioning machine according to claim 25, wherein said first and second actuator mechanisms comprise:
   respective motors connected respectively to ends of said first and second members; and
   respective shafts connected respectively to opposite ends of said first and second members.

27. A relative positioning machine according to claim 20, further comprising:
- first and second support mechanisms by which the first and second members are swingably supported for angular movement about respective first and second axes which extend parallel to each other;
- third and fourth support mechanisms by which the first and second members are swingably supported for angular movement about respective third and fourth axes which extend across said first and second axes, respectively;
- a first actuator mechanism for angularly moving said first and second members in unison with each other about said first and second axes, respectively, while said first and second members are being maintained parallel to each other by said joint mechanism; and
- a second actuator mechanism for angularly moving said first and second members in unison with each other about said third and fourth axes, respectively, while said first and second members are being maintained parallel to each other by said joint mechanism.

28. A relative positioning machine according to claim 27, wherein said first and second support mechanisms have a base on which said first and second members are tiltably supported for angular movement about said first and second axes, respectively, and wherein said third and fourth support mechanisms have respective first and second frames which are supported on said base and by which said first and second members are tiltably supported for angular movement about said third and fourth axes, respectively.

29. A relative positioning machine according to claim 28, wherein said first actuator mechanism comprises a motor fixedly mounted on said base and having a drive shaft extending along said second axis and coupled to said second frame, and wherein said second actuator mechanism comprises a motor fixedly mounted on said second frame and having a drive shaft extending along said fourth axis and coupled to said second member.

30. A relative positioning machine according to claim 27, wherein said first and second actuator mechanisms comprise respective first and second extendible/contractable assemblies coupled to said first and second members for tilting said first and second members about the first, second, third, and fourth axes in unison with each other through said joint mechanism.

31. A relative positioning machine according to claim 20, further comprising:
- first and second support mechanisms by which the first and second members are swingably supported for angular movement about respective first and second axes which extend parallel to each other;
- third and fourth support mechanisms by which the first and second members are swingably supported for angular movement about respective third and fourth axes which extend across said first and second axes, respectively; and
- an actuator mechanism for angularly moving said first and second members in unison with each other about the first, second, third, and fourth axes while said first and second members are being maintained parallel to each other by said joint mechanism.

32. A relative positioning machine according to claim 31, wherein said actuator mechanism comprises first and second actuators coupled to one of said first and second members on a straight line interconnecting a point of intersection between the first and third axes and a point of intersection between the second and fourth axes, for tilting said first and second members about the first, second, third, and fourth axes in unison with each other through said joint mechanism.

33. A relative positioning machine according to claim 20, further comprising:
- first and second support mechanisms by which the first and second members are tiltably supported for angular movement about a plurality of axes; and
- an actuator mechanism for tilting said first and second members about said plurality of axes while the first and second members are being maintained parallel to each other by said joint mechanism.

34. A relative positioning machine according to claim 33, wherein said first and second members have respective rods, said rods and said first and second support mechanisms jointly making up respective spherical pairs.

35. A relative positioning machine according to claim 20, further comprising a spindle supporting said machining tool, said spindle being axially movably mounted on said first member, said workpiece being mounted on said second member.

36. A relative positioning machine according to claim 20, further comprising a laser beam machining head as said machining tool, said laser beam machining head being mounted on said first member, said workpiece being mounted on said second member.

* * * * *